United States Patent [19]

Nakatsuji et al.

[11] Patent Number: 5,380,692
[45] Date of Patent: Jan. 10, 1995

[54] CATALYST FOR CATALYTIC REDUCTION OF NITROGEN OXIDE

[75] Inventors: Tadao Nakatsuji; Hiromitsu Shimizu; Ritsu Yasukawa, all of Osaka; Fujio Suganuma; Akihiro Kitazume, both of Saitama; Hiroshi Tsuchida, Kanagawa; Takehiko Ito; Hideaki Hamada, both of Ibaraki; Katsumi Miyamoto; Masaaki Kawatsuki, both of Saitama; Yoshiaki Kintaichi; Motoi Sasaki, both of Ibaraki; Mitsunori Tabata, Saitama, all of Japan

[73] Assignees: Sakai Chemical Industry Co., Ltd., Osaka; Agency of Industrial Science and Technology, Tokyo; Petroleum Energy Center, Tokyo; Cosmo Oil Co., Ltd., Tokyo, all of Japan

[21] Appl. No.: 944,106

[22] Filed: Sep. 11, 1992

[30] Foreign Application Priority Data

| Sep. 12, 1991 | [JP] | Japan | 3-262717 |
| Oct. 9, 1991 | [JP] | Japan | 3-290582 |
| Nov. 13, 1991 | [JP] | Japan | 3-326371 |
| Nov. 13, 1991 | [JP] | Japan | 3-326372 |
| Jan. 7, 1992 | [JP] | Japan | 4-018545 |
| Jan. 20, 1992 | [JP] | Japan | 4-007894 |
| Feb. 5, 1992 | [JP] | Japan | 4-020303 |
| Feb. 5, 1992 | [JP] | Japan | 4-020304 |
| Feb. 5, 1992 | [JP] | Japan | 4-020305 |
| Feb. 25, 1992 | [JP] | Japan | 4-038209 |

[51] Int. Cl.⁶ .............. B01J 21/04; B01J 21/06; B01J 21/12; B01J 23/58; B01J 23/60; B01J 23/66; B01J 23/76; B01J 35/02

[52] U.S. Cl. .............. 502/303; 502/304; 502/302; 502/525; 502/332; 502/328; 502/341; 502/329; 502/306; 502/241; 502/242; 502/244; 502/245; 502/246; 502/247; 502/248; 502/250; 502/251; 502/252; 502/253; 502/243; 502/324; 502/350; 502/307; 502/308; 502/309; 502/312; 502/313; 502/314; 502/315; 502/316; 502/317; 502/318; 502/327; 502/330; 502/331; 502/334; 502/335; 502/336; 502/342; 502/346; 502/348; 502/351; 502/349; 502/354

[58] Field of Search .............. 502/303, 304, 302, 525, 502/332, 328, 341, 329, 306, 241, 242, 244, 245, 246, 247, 248, 250, 251, 252, 253, 243, 324, 349, 350, 351, 307, 308, 309, 312, 313, 314, 315, 316, 317, 318, 327, 330, 331, 333, 334, 335, 336, 342, 346, 348, 351, 349, 354

[56] References Cited

U.S. PATENT DOCUMENTS

| 3,884,837 | 5/1975 | Remeika et al. | 502/525 X |
| 3,926,854 | 12/1975 | Whelan et al. | 502/303 |
| 4,089,810 | 5/1978 | Diwell et al. | 502/525 X |
| 4,151,123 | 4/1979 | McCann | 502/525 X |
| 4,162,235 | 7/1979 | Acres et al. | 502/525 X |
| 4,485,191 | 11/1984 | Sekido et al. | 502/525 X |
| 5,093,301 | 3/1992 | Chu et al. | 502/525 X |

FOREIGN PATENT DOCUMENTS 1030649 2/1989 Japan.
3186346 8/1991 Japan.

Primary Examiner—Paul Lieberman
Assistant Examiner—Douglas J. McGinty
Attorney, Agent, or Firm—Sughrue, Mion, Zinn, Macpeak & Seas

[57] ABSTRACT

A catalyst for catalytic reduction of nitrogen oxide using at least one reducing agent selected from the group consisting of a hydrocarbon and an oxygen-containing organic compound is described, which includes an oxide represented by formula (V):

$$A^5_x B^3_{3-x} C^4_3 O_7 \quad (V)$$

wherein $A^5$ represents at least one element selected from the group consisting of La, Y, Ce, Pr, Nd, Sm, Eu, and Gd; $B^3$ represents at least one element selected from the group consisting of Ba, Sr, Ca, Mg, Pb, Zn, and Ag; $C^4$ represents at least one element selected from the group consisting of Mn, Co, Fe, Ni, Cr, Cu, V, Mo, W, Ti, Zr, Nb, Pd, Rh, Ru, and Pt; and x is a number of from 0 to 1, supported on a solid acid carrier. Also, methods for catalytic reduction of nitrogen oxide are described including reacting nitrogen oxide with at least one reducing agent selected from the group consisting of a hydrocarbon and an oxygen-containing organic compound in the presence of oxygen and a specific catalyst.

2 Claims, No Drawings

CATALYST FOR CATALYTIC REDUCTION OF NITROGEN OXIDE

FIELD OF THE INVENTION

This invention relates to a catalyst for catalytic reduction of nitrogen oxide. More particularly, it relates to a catalyst for reduction of nitrogen oxide using a hydrocarbon and/or an oxygen-containing organic compound as a reducing agent, which is suitable for reducing and removing harmful nitrogen oxide present in emissions from factories, automobiles, etc.

BACKGROUND OF THE INVENTION

Nitrogen oxide present in exhaust or emissions have been removed by, for example, a method in which the nitrogen oxide is further oxidized and then absorbed in an alkali or a method comprising reducing it to nitrogen by using ammonia, hydrogen, carbon monoxide, hydrocarbons, etc. as a reducing agent.

These conventional methods have their own disadvantages. That is, the former method requires a means for handling the alkaline waste liquid to prevent environmental pollution. Of the latter method, the method of using ammonia as a reducing agent involves the problem that ammonia reacts with sulfur oxides in the emissions to form salts, resulting in a reduction in catalyst activity. When in using hydrogen, carbon monoxide, or a hydrocarbon as a reducing agent, the reducing agent preferentially undergoes reaction with oxygen because oxygen is present in a higher concentration than nitrogen oxide in emissions. This means that substantial reduction of nitrogen oxide requires a large quantity of the reducing agent.

It has recently been proposed to catalytically decomposing nitrogen oxide in the absence of a reducing agent. However, known catalysts for direct decomposition of nitrogen oxide have not yet been put to practical use due to their low decomposing activity.

On the other hand, H type zeolite, Cu ion-exchanged ZSM-5, etc. have also been proposed as a catalyst for catalytic reduction of nitrogen oxide using a hydrocarbon or an oxygen-containing organic compound as a reducing agent. In particular, H type ZSM-5 ($SiO_2$/$Al_2O_3$ molar ratio=30 to 40) are regarded optimal. However, even the H type ZSM-5 is not deemed to have sufficient reducing activity, and it has been demanded to develop a highly active catalyst for catalytic reduction of nitrogen oxide.

SUMMARY OF THE INVENTION

An object of the present invention is to provide a catalyst for catalytic reduction of nitrogen oxide using a hydrocarbon or an oxygen-containing organic compound as a reducing agent, which selectively catalyzes a reaction of nitrogen oxide with the reducing agent even in the presence of oxygen so than nitrogen oxide in emissions can be reduced efficiently without requiring a large quantity of the reducing agent.

The catalyst for catalytic reduction of nitrogen oxide according to the present invention which uses a hydrocarbon and/or an oxygen-containing organic compound as a reducing agent embraces the following embodiments.

(1) A catalyst for catalytic reduction of nitrogen oxide using a hydrocarbon and/or an oxygen-containing organic compound as a reducing agent, which comprises a perovskite type compound oxide represented by formula (I):

$$A^1{}_x B^1{}_{1-x} C^1 O_3 \qquad (I)$$

wherein $A^1$ represents at least one element selected from the group consisting of La, Y, Ce, Pr, Nd, Pm, Sm, Eu, and Gd; $B^1$ represents at least one element selected from the group consisting of Na, K, Bi, Th, Ba, Sr, Ca, Mg, Pb, Zn, and Ag; $C^1$ represents at least one element selected from the group consisting of Mn, Co, Fe, Ni, Cr, Cu, V, Mo, W, Ta, Li, Ti, Zr, Nb, Pd, Rh, Ru, and Pt; and x is a number of from 0 to 1, supported on a solid acid carrier, such as zeolite, metallosilicate, crystalline silicoaluminum phosphate (hereinafter abbreviated as SAPO), crystalline aluminum phosphate (hereinafter abbreviated as ALPO), crystalline metalloaluminum phosphate (hereinafter abbreviated as MAPO), alumina, titania, zirconia, silica-alumina, etc.

(2) A catalyst for catalytic reduction of nitrogen oxide using a hydrocarbon and/or an oxygen-containing organic compound as a reducing agent, which comprises a perovskite type compound oxide represented by formula (II):

$$A^2{}_x B^1{}_{1-x} C^1 O_3 \qquad (II)$$

wherein $A^2$ represents at least one element selected from the group consisting of La, Y, and Ce; and $B^1$, $C^1$, and x are as defined above, supported on a solid acid carrier, such as zeolite, metallosilicate, SAPO, ALPO, MAPO, alumina, titania, zirconia, silica-alumina, etc.

(3) A catalyst for catalytic reduction of nitrogen oxide using a hydrocarbon and/or an oxygen-containing organic compound as a reducing agent, which comprises a perovskite type compound oxide represented by formula (III):

$$A^3{}_x B^2{}_{1-x} C^2{}_y C^3{}_{1-y} O_3 \qquad (III)$$

wherein $A^3$ represents La or Ce; $B^2$ represents Ba, Sr, Ca, Mg, Pb, Zn, or Ag; $C^2$ represents Mn or Co; $C^3$ represents Fe, Ni, Cr, Cu, V, Mo, W, Ti, Zr, Nb, Pd, Rh, Ru, or Pt; x is as defined above; and y represents a number of from 0 to 1, supported on a solid acid carrier, such as zeolite, metallosilicate, SAPO, ALPO, MAPO, alumina, titania, zirconia, silica-alumina, etc.

(4) A catalyst for catalytic reduction of nitrogen oxide using a hydrocarbon and/or an oxygen-containing organic compound as a reducing agent, which comprises a perovskite type compound oxide represented by formula (IV):

$$A^4{}_{2-x} B^3{}_x C^4 O_4 \qquad (IV)$$

wherein $A^4$ represents at least one element selected from the group consisting of Y, La, Ce, Pr, Nd, Pm, Sm, Eu, Gd, and Bi; $B^3$ represents at least one element selected from the group consisting of Ba, Sr, Ca, Mg, Pb, Zn, and Ag; $C^4$ represents at least one element selected from the group consisting of Mn, Co, Fe, Ni, Cr, Cu, V, Mo, W, Ti, Zr, Nb, Pd, Rh, Ru, and Pt; and x are as defined above supported on a solid acid carrier.

(5) A catalyst for catalytic reduction of nitrogen oxide using a hydrocarbon and/or an oxygen-containing organic compound as a reducing agent, which comprises a perovskite type compound oxide represented by formula (V):

$$A^5{}_xB^3{}_{3-x}C^4{}_3O_7 \qquad (V)$$

wherein $A^5$ represents at least one element selected from the group consisting of La, Y, Ce, Pt, Nd, Sm, Eu, Gd, and Bi; $B^3$, $C^4$, and x are as defined above, supported on a solid acid carrier, such as zeolite, SAPO, ALPO, MAPO, alumina, titania, zirconia, silica-alumina, etc.

(6) A catalyst for catalytic reduction of nitrogen oxide using a hydrocarbon and/or an oxygen-containing organic compound as a reducing agent, which comprises a perovskite type compound oxide represented by formula (VI):

$$A^2{}_xB^3{}_{3-x}C^4{}_3O_7 \qquad (VI)$$

wherein $A^2$, $B^3$, $C^4$, and x are as defined above, supported on a solid acid carrier, such as zeolite, SAPO, ALPO, MAPO, alumina, titania, zirconia, silica-alumina, etc.

(7) A catalyst for catalytic reduction of nitrogen oxide using a hydrocarbon and/or an oxygen-containing organic compound as a reducing agent, which comprises a perovskite type compound oxide represented by formula (I) supported on a solid acid carrier having at least one element selected from the group consisting of Ti, Cr, Mn, Fe, Co, Ni, Cu, Zn, Ga, Ge, Y, Zr, Nb, Ru, Rh, Pd, Pt, Ag, Sn, La, Nd, Ce, Pb, Mg, Ca, Sr, Ba, and Bi.

(8) A catalyst for catalytic reduction of nitrogen oxide using a hydrocarbon and/or an oxygen-containing organic compound as a reducing agent, which comprises a perovskite type compound oxide represented by formula (II) supported on a solid acid carrier having at least one element selected from the group consisting of Ti, Cr, Mn, Fe, Co, Ni, Cu, Zn, Ga, Ge, Y, Zr, Nb, Ru, Rh, Pd, Pt, Ag, Sn, La, Ce, Pb, Mg, Ca, Sr, Ba, and Bi.

(9) A catalyst for catalytic reduction of nitrogen oxide using a hydrocarbon and/or an oxygen-containing organic compound as a reducing agent, which comprises a perovskite type compound oxide represented by formula (III) supported on a solid acid carrier having at ].east one element selected from the group consisting of Ti, Cr, Mn, Fe, Co, Ni, Cu, Zn, Ga, Ge, Y, Zr, Nb, Ru, Rh, Pd, Pt, Ag, Sn, La, Ce, Pb, and Bi.

DETAILED DESCRIPTION OF THE INVENTION

The terminology "solid acid carrier" as used in the present invention means a carrier which is solid and acidic in a temperature at which the catalyst is used. Solid acidity can be confirmed by a temperature rise release method using ammonia or an in situ FTIR (Fourier transform infrared spectrophotometry) method using ammonia or pyridine. The solid acid carrier which can be used in the present invention includes zeolite type solid acid carriers and oxide type solid acid carriers.

The zeolite type solid acid carriers can be obtained by treating heat-resistant zeolite, such as Na-mordenite, Na-ZSM-5, Na-USY (USY: ultrastable Y type zeolite), or metallosilicates (zeolite whose aluminum is partly or wholly replaced with another metallic element, especially iron, gallium, zinc, lanthanum, copper, molybdenum, chromium, germanium, titanium, or boron), with an aqueous solution of an ammonium salt (e.g., ammonium sulfate) or an acid (e.g., sulfuric acid) to exchange a part of or the whole of the alkali metal of the zeolite for an ammonium ion or a hydrogen ion. In the case where the alkali metal is exchanged for an ammonium ion, the product finally requires calcining.

Examples of the zeolite type solid acid carrier include acid type mordenite represented by formula (a) shown below, which is obtained by an acid treatment of mordenite type zeolite:

$$M_2((AlO_2)_{2\pm r}(SiO_2)_{10}) \cdot zH_2O \qquad (a)$$

wherein M represents an alkali metal ion; and r is a number subject to variation depending on the conditions of zeolite synthesis, with the $SiO_2/Al_2O_3$ molar ratio ranging from 13 to 20 and the $SiO_2/H_2O$ molar ratio ranging from 25 to 200, and zeolite represented by formula (b) shown below, which is obtained by exchanging a part of or the whole of ion M of zeolite for a titanium ion ($Ti^{4+}$), a zirconium ion ($Zr^{4+}$), or a tin ion ($Sn^{4+}$):

$$M'_A((AlO_2)_p(SiO_2)_q) \cdot z'H_2O \qquad (b)$$

wherein M' represents an alkali metal ion, an alkaline earth metal ion, or a hydrogen ion; nA=P (wherein n is a valence number of ion M'); and q/p is 5 or more.

The oxide type solid acid carriers include single metal oxides, such as $Al_2O_3$, $TiO_2$, $TiO_2/SO_4{}^-$, $ZrO_2$, and $ZrO_2/SO_4{}^-$, and compound oxides, such as $SiO_2/Al_2O_3$, $TiO_2/Al_2O_3$, and $TiO_2/ZrO_2$. From the standpoint of heat resistance, preferred of them are $Al_2O_3$, $ZrO_2$, and $SiO_2/Al_2O_3$.

Usable solid acid carriers further include ALPO having a zeolite-like porous structure or a lamellar structure and its analogues (hereinafter inclusively referred to as ALPO type phosphates), such as SAPO and MAPO (obtained by displacing part of phosphorus or phosphorus-aluminum of ALPO with a metal, e.g., titanium, iron, magnesium, zinc, manganese, or cobalt).

The ALPO type phosphates can be prepared by a hydrothermal process using a raw material comprising the above-mentioned phosphorus source, a metal source, and an appropriate component selected from silica, silica sol, sodium silicate, etc., having mixed therewith a so-called template, e.g., an amine and a quaternary ammonium compound. The conditions for the ALPO type phosphate synthesis are similar to zeolite synthesis. A main difference therebetween consists in that the former is synthesized in an acidic condition in higher temperatures (usually 150° C. or higher) than those employed for the latter.

The composition off the ALPO type phosphates is generality represented by $Al_2O_3 \cdot (0.8-1.2) \cdot P_2O_5 \cdot nH_2O$. In SAPO or MAPO, the amount of phosphorus and/or aluminum to be displaced with silica or a metal is about 1/10 the total amount of aluminum and phosphorus at the highest. SAPO or MAPO whose silica or metal content is out of this range, i.e., those containing an amorphous substance may also be employable in the present invention.

Where an ALPO type phosphate obtained by a hydrothermal process is used as a carrier, the synthetic product is usually washed with water, dried, and calcined in air to remove the remaining template.

The catalyst according to the above-mentioned embodiments (1) to (6) can be prepared by the following processes (A) to (C).

Process (A)

A water-soluble salt (e.g., nitrate) of La, Ce, Y, Pr, Nd, Pm, Sm, Eu, Gd, Na, K, Bi, Th, Ba, Sr, Ca, Mg, Pb, Zn, Ag, Mn, Co, Fe, Ni, Cr, Cu, V, Mo, W, Ta, Li, Ti, Zr, Nb, Pd, Rh, Ru, or Pt or an alcohol solution of an alkoxide of the above-mentioned element is poured into a slurry of a solid acid carrier, and the slurry is neutralized or hydrolyzed to form a precipitate. Otherwise, the slurry is spray dried or freeze-dried to make a precursor of a perovskite compound, such as a compound hydroxide of these metals, be supported on the solid acid carrier. The resulting solid is worked up by repeatedly subjecting to filtration, washing with water, and repulping, and then dried and calcined.

Process (B)

A solid acid carrier and a separately prepared perovskite compound are thoroughly wet ground by means of a planetary mill, etc.

Process (C)

A precursor of a solid acid carrier, such as a water-soluble salt or a hydroxide, and a water-soluble salt (e.g., nitrate) of La, Ce, Y, Pr, Nd, Pm, Sm, Eu, Gd, Na, K, Bi, Th, Ba, Sr, Ca, Mg, Pb, Zn, Ag, Mn, Co, Fe, Ni, Cr, Cu, V, Mo, W, Ta, Li, Ti, Zr, Nb, Pd, Rh, Ru, or Pt or an alcohol solution of an alkoxide of the above-mentioned element are uniformly mixed, and the resulting homogeneous solution is neutralized or hydrolyzed to form a precipitate. The precipitate is worked up by repeatedly subjecting to filtration, washing with water, and repulping, and then dried and calcined.

In the above-mentioned embodiments (7) to (9), at least one element selected from the group consisting of Ti, Cr, Mn, Fe, Co, Ni, Cu, Zn, Ga, Ge, Y, Zr, Nb, Ru, Rh, Pd, Pt, Ag, Sn, La, Nd, Ce, Pb, Mg, Ca, Sr, Ba, and Bi can be supported on the solid acid carrier by any of known techniques, such as an ion-exchange method, a precipitation method, and a mixing method. Of these methods, an ion-exchange method is preferred. For example, a part of or the whole of ion M or M' of zeolite represented by formula (a) or (b) can be displaced with the above-enumerated element(s) by a known ion-exchange method.

The catalysts according to embodiments (7) to (9) can prepared, for example, by the following processes (D) or (F).

Process (D)

Zeolite, for example, the zeolite represented by formula (a) or (b) is poured into an aqueous solution of a water-soluble salt (e.g., nitrate) of one or more of Ti, Cr, Mn, Fe, Co, Ni, Cu, Zn, Ga, Ge, Y, Zr, Nb, Ru, Rh, Pd, Ag, Sn, La, Nd, Ce, Pb, Mg, Ca, Sr, Ba, and Bi to thereby exchange $M_2$ of formula (a) or $M'_4$ of formula (b) for the metal ion(s) or the metal ion(s) and a hydrogen ion. Where a desired ion-exchange rate is not reached through a single ion-exchange operation, the above-mentioned procedure is repeated. The slurry is repeatedly subjected to filtration, washing, and repulping, and finally dried. If desired, the product is calcined.

Into a slurry of the thus prepared carrier are simultaneously poured a water-soluble salt (e.g., nitrate) of La, Ce, Pr, Nd, Pm, Sm, Eu, Gd, Y, Na, K, Bi, Th, Ba, Sr, Ca, Mg, Pb, Zn, Ag, Mn, Co, Fe, Ni, Cr, Cu, V, Mo, W, Ta, Li, Ti, Zr, Nb, Pd, Rh, Ru, or Pt or an alcohol solution of an alkoxide of the above-mentioned element and a neutralizing agent (e.g., aqueous ammonia) or a precipitating medium to precipitate a precursor of a perovskite compound on the carrier. The perovskite compound precursor-on-carrier is repeatedly subjected to filtration, washing, and repulping and finally dried and calcined.

Process (E)

The solid acid carrier obtained by process (D) and a separately prepared perovskite compound are thoroughly wet ground in a planetary mill, etc. and dried. If desired, the dried product is calcined.

In carrying out the above-described processes, it is preferable to keep the temperature of forming a perovskite compound low. With the temperature being controlled low, a possible reaction between the solid acid carrier and the elements constituting the perovskite compound can be inhibited so as to prevent denaturation of the solid acid carrier. Further, the lower the temperature, the greater the specific surface area of the resulting perovskite compound. As a result, a reduction in catalyst activity due to a reduction in yield of the perovskite compound can be avoided.

Accordingly, when a solid acid carrier showing high reactivity with the elements constituting a perovskite compound, such as $Al_2O_3$ or $TiO_2$, is used, process (C) is not suitable because, in process (C), the elements constituting a solid acid carrier and those constituting a perovskite compound are mixed in high homogeneity. In general, process (A) is recommended. Catalysts having fairly high activity can also be obtained by process (B).

The amount of the perovskite compound to be supported on the solid acid carrier preferably ranges from 0.1 to 70% by weight, and more preferably from 5 to 50% by weight, based on the total amount of the perovskite compound and the carrier. If the perovskite compound exceeds 70% by weight, no further effects is expected. Besides, consumption of the hydrocarbon or oxygen-containing organic compound by oxygen would be increased in a reaction system containing oxygen. On the other than, if the perovskite compound is less than 0.1% by weight, the reducing activity of the catalyst cannot be increased as expected.

The catalyst according to the present invention may be shaped into various shapes, such as a honeycomb shape and a spherical shape, by any of well-known shaping methods. If desired, appropriate additives, such as shaping assistants, reinforcements, inorganic fibers, and organic binders, may be used on shaping. The catalyst may be coated on a previously molded base by, for example, a wash coat method. Preparation of the catalyst is not limited to the above-mentioned methods, and any of known catalyst preparation techniques may be applied.

The hydrocarbons which can be used as a reducing agent in the present invention include gases, such as methane, ethane, and butylene; and liquids, such as single component hydrocarbons, e.g., pentane, hexane, octane, heptane, benzene, toluene, and xylene, and petroleum hydrocarbons, e.g., gasoline, kerosine, gas oil, and heavy oil. Preferred of them are lower alkynes, e.g., acetylene, methylacetylene, and 1-butyne; lower alkenes, e.g., ethylene, propylene, isobutylene, 1-butene, and 2-butene; lower dienes, e.g., butadiene and isoprene; and lower alkanes, e.g., propane and butane.

The amount of the hydrocarbon to be used, though varying depending on the kind, is preferably from about 0.1 to 2 mols per mol of nitrogen oxide. If the hydrocarbon molar ratio is less than 0.1, sufficient reducing activity cannot be obtained. If it exceeds 2, the amount of the hydrocarbon which is withdrawn as being unreacted increases, needing any post treatment for recovery of the unreacted hydrocarbon.

The terminology "oxygen-containing organic compound" as used herein for a reducing agent means an organic compound having an oxygen element in the molecule thereof. Specific examples of the oxygen-containing organic compound include alcohols, e.g., methyl alcohol, ethyl alcohol, propyl alcohol, and octyl alcohol; ethers, e.g., dimethyl ether, diethyl ether, and dipropyl ether; esters, e.g., methyl acetate, ethyl acetate, and fats and oils; and ketones, e.g., acetone and methyl ethyl ketone; with lower alcohols, e.g., methyl alcohol and ethyl alcohol, being preferred.

The above-mentioned hydrocarbons and oxygen-containing organic compounds may be used either singly or in combination of two or more thereof. One or more of the hydrocarbons and one or more of the oxygen-containing organic compounds may be used in combination.

In addition, uncombusted matters or incomplete combustion products of fuels, etc. present in emissions, i.e., hydrocarbons and particulate matters, are also effective as a reducing agent and, accordingly, included in the term "hydrocarbons" as used in the present invention. In other words, the catalyst of the present invention is deemed useful for removal or reduction of the hydrocarbons or particulate matters of emissions from cars, factories, etc.

The temperature at which the above-mentioned reducing agent selectively reduces nitrogen oxide ascends in the order of oxygen-containing organic compounds, alkynes, alkenes, aromatic hydrocarbons, and alkanes. The greater the carbon atom number of hydrocarbons, the lower the effective temperature.

A suitable temperature for the catalyst of the present invention to show catalysis in reduction of nitrogen oxide usually ranges from 100 to 800° C., and preferably from 200 to 600° C., though varying depending on the kind of the reducing agent or catalyst species used. Within the above-recited temperature range, exhaust gas to be treated is preferably made to flow at a space velocity (SV) of from 500 to 100000 $hr^{-1}$.

The present invention is now illustrated in greater detail with reference to Examples, but it should be understood that the present invention is not deemed to be limited thereto. All the parts, percents, and ratios are by weight unless otherwise indicated.

EXAMPLE A-1

In 500 ml of water were dissolved 101.05 g of lanthanum nitrate hexahydrate ($La(NO_3)_2 \cdot 6H_2O$), 28.60 g of manganese acetate tetrahydrate ($Mn(Ac)_2 \cdot 4H_2O$; Ac is $CH_3COO$, hereinafter the same), 74.08 g of strontium nitrate ($Sr(NO_3)_2$), and 135.83 g of cobalt nitrate hexahydrate ($Co(NO_3)_2 \cdot 6H_2O$).

The resulting aqueous solution was adjusted to a pH of 10 by addition of a 121 g/l aqueous solution of sodium hydroxide with thorough stirring. After a precipitate was formed, the stirring was further continued for an additional period of 18 hours for maturing. The mixture was repeatedly filtered, washed with water, and repulped until the filtrate had substantially the same conductivity as that of repulping water. The resulting filter cake was dried at 120° C. for 18 hours and then calcined at 700° C. for 3 hours.

The X-ray diffractometry of the resulting calcined product revealed formation of a perovskite crystal phase. The calcined product had a specific surface area of 23.7 $m^2/g$ as measured by a BET method (hereinafter the same) ($La_{0.4}Sr_{0.6}Co_{0.8}Mn_{0.2}O_3$).

Separately, metatitanic acid ($TiO_2 \cdot H_2O$) obtained from a sulfuric acid process titanium oxide step was calcined at 600° C. for 3 hours to prepare activated titanium oxide (specific surface area: 104.2 $m^2/g$).

Thirty grams of the perovskite compound were mixed with 100 g of the activated titanium oxide, and 100 g of water was added thereto. The mixture was ground in a planetary mill for 30 minutes, and the viscosity of the resulting slurry was adjusted with water to prepare a wash coating slurry. The slurry was coated on a honeycomb having a pitch of 1.25 mm (a product of Cordierite Co.; the same honeycomb was used in all the following examples) to obtain a catalyst-on-honeycomb (designated sample A-1) having 0.116 g of the catalyst per $cm^3$ of the honeycomb.

EXAMPLE A-2

A perovskite compound ($LaMnO_3$) was prepared in the same manner as in Example A-1, except for using 89.5 g of lanthanum nitrate hexahydrate and 50.66 g of manganese acetate tetrahydrate. The resulting perovskite compound had a specific surface area of 29.1 $m^2/g$.

To a mixture of 30 g of the perovskite compound and 100 g of $\gamma$-alumina ("A-11" produced by Sumitomo Chemical Co., Ltd.) was added 100 g of water to prepare a wash coating slurry. The slurry was coated on a honeycomb to prepare sample A-2 having 0.094 g of the catalyst per $cm^3$ of the honeycomb.

EXAMPLE A-3

A perovskite compound ($La_{0.8}Pb_{0.2}MnO_3$) was obtained in the same manner as in Example A-1, except for using 71.60 g of lanthanum nitrate hexahydrate, 13.69 g of lead nitrate ($Pb(NO_3)_2$), and 50.66 g of manganese acetate tetrahydrate and conducting calcination at 800° C. for 3 hours. The resulting perovskite compound had a specific surface area of 23.7 $m^2/g$.

To a mixture of 30 g of the perovskite compound and 100 g of $\gamma$-alumina ("A-11") was added 100 g of water to prepare a slurry. The slurry was coated on a honeycomb to prepare sample A-3 having 0.117 g of the catalyst per $cm^3$ of the honeycomb.

EXAMPLE A-4

A perovskite compound ($LaCoO_3$) was obtained in the same manner as in Example A-1, except for using 88.07 g of lanthanum nitrate hexahydrate and 59.19 g of cobalt nitrate hexahydrate ($Co(NO_3)_2 \cdot 6H_2O$) and conducting calcination at 800° C. for 3 hours. The resulting perovskite compound had a specific surface area of 17.4 $m^2/g$.

To a mixture of 30 g of the perovskite compound and 100 g of H type mordenite ("HM-23" produced by Nippon Kagaku Co., Ltd.) was added 100 g of water to prepare a slurry. The slurry was coated on a honeycomb to prepare sample A-4 having 0.113 g of the catalyst per $cm^3$ of the honeycomb.

EXAMPLE A-5

A perovskite compound ($Ce_{0.8}Ba_{0.2}CoO_3$) was obtained in the same manner as in Example A-1, except for using 70.65 g of cerium nitrate hexahydrate (Ce(-

$NO_3)_2 \cdot 6H_2O$), 10.63 g of barium nitrate ($Ba(NO_3)_2$), and 59.19 g of cobalt nitrate hexahydrate. The resulting perovskite compound had a specific surface area of 23.0 $m^2/g$.

To a mixture of 30 g of the perovskite compound and 100 g of H type mordenite ("HM-23") was added 100 g of water to prepare a slurry. The slurry was coated on a honeycomb to prepare sample A-5 having 0.130 g of the catalyst per $cm^3$ of the honeycomb.

EXAMPLE A-6

A perovskite compound ($LaMn_{0.5}Ti_{0.5}O_3$) was obtained in the same manner as in Example A-1, except for using 90.84 g of lanthanum nitrate hexahydrate, 25.71 g of manganese acetate tetrahydrate, and 339.0 ml of a titanium tetrachloride aqueous solution (Ti content: 14.82 g/100 ml). The resulting perovskite compound had a specific surface area of 25.3 $m^2/g$.

To a mixture of 10 g of the perovskite compound and 100 g of silica-alumina ("COK-84" produced by Nippon Aerosil Co., Ltd.) was added 100 g of water to prepare a slurry. The slurry was coated on a honeycomb to prepare sample A-6 having 0.098 g of the catalyst per $cm^3$ of the honeycomb.

EXAMPLE A-7

Preparation of Perovskite Compound

A hundred milliliters of an ethanol solution of lanthanum ethoxide (a product of Hakusui Kagaku Kogyo Co., Ltd.; hereinafter the same) ($La_2O_3$ content: 73 g/l), 21.74 ml of an ethanol solution of barium ethoxide (a product of Hakusui Kagaku Kogyo Co., Ltd.; hereinafter the same) (BaO content: 79 g/l), 49.95 ml of an ethanol solution of nickel ethoxide ( (a product of Hakusui Kagaku Kogyo Co., Ltd.; hereinafter the same) (NiO content: 67 g/l), and 9.22 ml of an ethanol solution of cobalt ethoxide (CoO content: 91 g/l) were mixed, and a 1% aqueous ammonia was slowly added dropwise to the mixture while thoroughly stirring to conduct hydrolysis.

The reaction mixture was evaporated to dryness while uniformly mixing, and the residue was calcined at 600° C. for 3 hours to obtain a perovskite compound ($La_{0.8}Ba_{0.2}Co_{0.8}Ni_{0.2}O_3$). The perovskite compound had a specific surface area 36.9 $m^2/g$.

Preparation of SAPO-34

To 129.6 g of water was added 90.7 g of finely ground aluminum isopropoxide in small portions with stirring, and the mixture was stirred to form a uniform mixture. To the mixture was added dropwise 51.3 g of a 85% phosphoric acid aqueous solution, followed by stirring to form a uniform mixture. To the mixture was further added 16.0 g of 50% silica sol, followed by thoroughly stirring to form a uniform mixture.

Then, 81.6 g of tetraethylammonium hydroxide was added thereto, followed by thoroughly stirring. The mixture was charged in an autoclave and allowed to react at 200° C. for 24 hours. The reaction product was collected by filtration, washed with water, dried, and calcined in air at 500° C. for 3 hours to obtain SAPO-34. SAPO-34 was found to contain 9.5% of Si, 18.0% of Al, and 19.0% of P.

To a mixture of 25 g of the perovskite compound and 100 g of SAPO-34 was added 100 g of water to prepare a slurry. The slurry was coated on a honeycomb to obtain sample A-7 having 0.138 g of the catalyst per $cm^3$ of the honeycomb.

EXAMPLE A-8

A perovskite compound ($La_{0.4}Sr_{0.6}Co_{0.8}Fe_{0.2}O_3$) was obtained in the same manner as in Example A-1, except for using 101.05 g of lanthanum nitrate hexahydrate, 74.08 g of strontium nitrate, 135.83 g of cobalt nitrate hexahydrate, and 33.60 g of ferrous nitrate hexahydrate ($Fe(NO_3)_2 \cdot 6H_2O$). The resulting perovskite compound had a specific surface area of 21.6 $m^2/g$.

To a mixture of 30 g of the perovskite compound and 100 g of γ-alumina ("A-11") was added 100 g of water to prepare a slurry. The slurry was coated on a honeycomb to prepare sample A-8 having 0.098 g of the catalyst per $cm^3$ of the honeycomb.

EXAMPLE A-9

A perovskite compound ($La_{0.8}Zn_{0.2}Co_{0.8}Cu_{0.2}O_3$) was obtained in the same manner as in Example A-1, except for using 202.10 g of lanthanum nitrate hexahydrate, 28.41 g of zinc nitrate hexahydrate ($Zn(NO_3)_2 \cdot 6H_2O$), 135.83 g of cobalt nitrate hexahydrate, and 28.19 g of cupric nitrate trihydrate ($Cu(NO_3)_2 \cdot 3H_2O$). The resulting perovskite compound had a specific surface area of 17.3 $m^2/g$.

To a mixture of 30 g of the perovskite compound and 100 g of γ-alumina ("A-11") was added 100 g of water to prepare a slurry. The slurry was coated on a honeycomb to prepare sample A-9 having 0.083 g of the catalyst per $cm^3$ of the honeycomb.

EXAMPLE A-10

A perovskite compound ($La_{0.8}Ag_{0.2}Co_{0.8}Zn_{0.2}O_3$) was obtained in the same manner as in Example A-1, except for using 202.10 g of lanthanum nitrate hexahydrate, 19.82 g of silver nitrate ($AgNO_3$), 135.83 g of cobalt nitrate hexahydrate, and 69.87 g of zirconium nitrate pentahydrate ($Zr(NO_3)_4 \cdot 5H_2O$). The resulting perovskite compound had a specific surface area of 17.3 $m^2/g$.

To a mixture of 30 g of the perovskite compound and 100 g of γ-alumina ("A-11") was added 100 g of water to prepare a slurry. The slurry was coated on a honeycomb to prepare sample A-10 having 0.097 g of the catalyst per $cm^3$ of the honeycomb.

EXAMPLE A-11

A Preparation of Perovskite Compound:

A perovskite compound ($La_{0.4}Sr_{0.6}Co_{0.8}Cr_{0.2}O_3$) was obtained in the same manner as in Example A-1, except for using 101.05 g of lanthanum nitrate hexahydrate, 74.08 g of strontium nitrate, 135.83 g of cobalt nitrate hexahydrate, and 27.79 g of chromium nitrate ($Cr(NO_3)_3$). The resulting perovskite compound had a specific surface area of 20.3 $m^2/g$.

Preparation of ALPO-5

To a mixture of 69.2 g of 85% phosphoric acid and 178 g of water was added 45.8 g of false boehmite powder (containing 67% of alumina and 9.5% of acetic acid) in small portions, and the mixture was stirred to form a uniform mixture. To the mixture was added 43.8 g of tripropylamine, followed by stirring to form a uniform mixture. The mixture was charged in an autoclave and allowed to react at 150° C. for 70 hours with stirring. The reaction product was collected by filtration, washed with water, dried, and calcined in air at 500° C. for 3 hours to obtain ALPO-5. ALPO-5 was found to contain 18.0% of Al and 22.0% of P.

To a mixture of 30 g of the perovskite compound and 100 g of ALPO-5 was added 100 g of water to prepare a slurry. The slurry was coated on a honeycomb to obtain sample A-11 having 0.104 g of the catalyst per $cm^3$ of the honeycomb.

EXAMPLE A-12

Preparation of Perovskite Compound

A perovskite compound ($La_{0.4}Sr_{0.6}Co^{0.8}Nb_{0.2}O_3$) was obtained in the same manner as in Example A-1, except for using 101.05 g of lanthanum nitrate hexahydrate, 74.08 g of strontium nitrate, 135.83 g of cobalt nitrate hexahydrate, and 216.81 ml of a niobium pentachloride solution in a hydrochloric acid aqueous solution (Nb content: 50 g/l). The resulting perovskite compound had a specific surface area of 18.9 $m^2/g$.

Preparation of MAPO-5

To a solution of 4.9 g of manganese (II) acetate, 4.1 g of cupric acetate, and 129 g of water was added 56.3 g of finely ground aluminum isopropoxide in small portions, and the mixture was stirred to form a uniform mixture. A mixture of 55.4 g of 85% phosphoric acid, 56.3 g of diethylethanolamine, and 55.5 g of water was added to the mixture in small portions with stirring, followed by stirring to form a uniform mixture. The mixture was charged in an autoclave and allowed to react at 200° C. for 25 hours. The reaction product was collected by filtration, washed with water, dried, and calcined in air at 500° C. for 3 hours to obtain MAPO-5. MAPO-5 was found to contain 19.0% of Al, 19.0% of P, 2.8% of Mn, and 4.4% of Cu.

To a mixture of 25 g of the perovskite compound and 100 g of MAPO-5 was added 100 g of water to prepare a slurry. The slurry was coated on a honeycomb to obtain sample A-12 having 0.116 g of the catalyst per $cm^3$ of the honeycomb.

EXAMPLE A-13

Sample A-13 was prepared in the same manner as in Example A-1, except for replacing the activated titanium oxide with zirconium oxide obtained by calcining zirconium hydroxide at 600° C. for 3 hours ($ZrO_2$; specific surface area: 148.3 $m^2/g$). The sample contained 0.139 g of the catalyst per $cm^3$ of the honeycomb.

EXAMPLE A-14

Preparation of Perovskite Compound

In 500 ml of water were dissolved 88.07 g of lanthanum nitrate hexahydrate, 10.76 g of strontium nitrate, and 50.66 g of cobalt acetate tetrahydrate. To the resulting aqueous solution was added dropwise a 121 g/l sodium hydroxide aqueous solution to adjust to a pH of 10 while thoroughly stirring. After a precipitate was formed, the stirring was further continued for an additional period of 18 hours for maturing, The mixture was repeatedly filtered, washed with water, and repulped until the filtrate had substantially the same conductivity as repulping water. The resulting filter cake was dried at 120° C. for 18 hours.

The dried product was ground, and 25.90 ml of a vanadyl oxalate aqueous solution (V content: 100 g/l) was added thereto, followed by thoroughly kneading. The blend was evaporated to dryness, dried at 120° C. for 18 hours, and calcined at 850° C. for 3 hours to obtain a perovskite compound ($La_{0.8}Sr_{0.2}Co_{0.8}V_{0.2}O_3$). The resulting perovskite compound had a specific surface area of 12.8 $m^2/g$.

Preparation of Silica-Zirconia

A hundred grams of O type silica sol (a product of Nissan Chemicals Industries, Ltd.; $SiO_2$ content: 20%) and 97.20 g of zirconium chloride ($ZrCl_4$) were mixed by thoroughly stirring, and water was added thereto to make 500 ml. To the solution was added a 121 g/l sodium hydroxide aqueous solution to adjust to a pH of 10. After a precipitate was formed, the mixture was stirred for 18 hours. The reaction product was repeated filtered, washed with water, and repulped. The filter cake was dried at 120° C. for 18 hours and then calcined at 500° C. for 3 hours. The resulting silica-zirconia had a specific surface area of 297 $m^2/g$.

To a mixture of 30 g of the perovskite compound and 100 g of the above prepared silica-zirconia was added 100 g of water, and the mixture was ground in a planetary mill for 30 minutes and diluted with water to prepare a wash coating slurry. The slurry was coated on a honeycomb to prepare sample A-14 having 0.127 g of the catalyst per $cm^3$ of the honeycomb.

EXAMPLE A-15

Preparation of Perovskite Compound

A perovskite compound ($La_{0.8}Sr_{0.2}Co_{0.8}Mo_{0.2}O_3$) was prepared in the same manner as in Example A-14, except for replacing the vanadyl oxalate aqueous solution with 260.22 ml of an aqueous ammonia solution of ammonium molybdate ($MoO_2$ content: 25 g/l). The resulting perovskite compound had a specific surface area of 11.4 $m^2/g$.

Preparation of Zr-Mordenite

A hundred grams of Na-mordenite ("NM-100P" produced by Nippon Kagaku Co., Ltd.) were dipped in a zirconyl nitrate aqueous solution ($ZrO_2$ content: 100 g/l), and the system was kept at 70° C. for 1 hour with stirring to exchange the Na ion for a Zr ion. The solid was collected by filtration, washed with water, dried, and calcined at 650° C. for 4 hours. The thus obtained zeolite (Zr-mordenite) had a Zr content of 3.3% and a specific surface area of 391 $m^2/g$.

To a mixture of 30 g of the perovskite compound and 100 g of the above prepared Zr-mordenite was added 100 g of water, and the mixture was ground in a planetary mill for 30 minutes and diluted with water to prepare a wash coating slurry. The slurry was coated on a honeycomb to prepare sample A-15 having 0.135 g of the catalyst per $cm^3$ of the honeycomb.

EXAMPLE A-16

A perovskite compound ($La_{0.8}Sr_{0.2}Co_{0.8}W_{0.2}O_3$) was prepared in the same manner as in Example A-14, except for replacing the vanadyl oxalate aqueous solution with 23.58 g of an aqueous solution of ammonium metatungstate ($WO_3$ content: 50%). The resulting perovskite compound had a specific surface area of 13.6 $m^2/g$.

To a mixture of 30 g of the perovskite compound and 100 g of γ-alumina ("A-11") was added 100 g of water, and the mixture was ground in a planetary mill for 30 minutes and diluted with water to prepare a wash coating slurry. The slurry was coated on a honeycomb to prepare sample A-16 having 0.135 g of the catalyst per cm$^3$ of the honeycomb.

EXAMPLE A-17

In 1000 ml of water were dissolved 173.20 g of lanthanum nitrate hexahydrate, 126.98 g of strontium nitrate, 276.48 g of cobalt nitrate tetrahydrate, and 25.90 g of chloroplatinic acid hexahydrate ($H_2PtCl_6 \cdot 6H_2O$). To the resulting aqueous solution was added dropwise a 121 g/l sodium hydroxide aqueous solution to adjust to a pH of 10 while thoroughly stirring. After completion of the hydrolysis reaction, the stirring was further continued for 18 hours. The mixture was worked-up in the same manner as in Example A-1 to obtain a perovskite compound ($La_{0.4}Sr_{0.6}Co_{0.95}Pt_{0.50}O_3$). The resulting perovskite compound had a specific surface area of 27.6 m$^2$/g.

To a mixture of 30 g of the perovskite compound and 100 g of γ-alumina ("A-11") was added 100 g of water, and the mixture was ground in a planetary mill for 30 minutes and diluted with water to prepare a wash coating slurry. The slurry was coated on a honeycomb to prepare sample A-17 having 0.123 g of the catalyst per cm$^3$ of the honeycomb.

EXAMPLES A-18

A perovskite compound ($La_{0.4}Sr_{0.6}Co_{0.95}Rh_{0.05}O_3$) was obtained in the same manner as in Example A-17, except for replacing chloroplatinic acid hexahydrate with 8.67 g of rhodium nitrate dihydrate ($Rh(NO_3)_3 \cdot 2H_2O$). The resulting perovskite compound had a specific surface area of 29.6 m$^2$/g.

To a mixture of 30 g of the perovskite compound and 100 g of γ-alumina ("A-11") was added 100 g of water, and the mixture was ground in a planetary mill for 30 minutes and diluted with water to prepare a wash coating slurry. The slurry was coated on a honeycomb to prepare sample A-18 having 0.129 g of the catalyst per cm$^3$ of the honeycomb.

EXAMPLE A-19

A perovskite compound ($La_{0.4}Sr_{0.6}Co_{0.95}Pd_{0.05}O_3$) was obtained in the same manner as in Example A-17, except for replacing chloroplatinic acid hexahydrate with 8.67 g of palladium chloride ($PdCl_2$). The resulting perovskite compound had a specific surface area of 28.5 m$^2$/g.

To a mixture of 30 g of the perovskite compound and 100 g of γ-alumina ("A-11") was added 100 g of water, and the mixture was ground in a planetary mill for 30 minutes and diluted with water to prepare a wash coating slurry. The slurry was coated on a honeycomb to prepare sample A-19 having 0.122 g of the catalyst per cm$^3$ of the honeycomb.

EXAMPLE A-20

A perovskite compound ($La_{0.4}Sr_{0.06}Co^{0.95}Ru_{0.05}O_3$) was obtained in the same manner as in Example A-17, except for replacing chloroplatinic acid hexahydrate with 16.15 g of ruthenium chloride pentahydrate ($RuCl_4 \cdot 5H_2O$). The resulting perovskite compound had a specific surface area of 25.3 m$^2$/g.

To a mixture of 30 g of the perovskite compound and 100 g of γ-alumina ("A-11") was added 100 g of water, and the mixture was ground in a planetary mill for 30 minutes and diluted with water to prepare a wash coating slurry. The slurry was coated on a honeycomb to prepare sample A-20 having 0.129 g of the catalyst per cm$^3$ of the honeycomb.

EXAMPLE A-21

Sample A-21 was prepared in the same manner as in Example A-4, except for using 1 g of the perovskite compound ($LaCoO_3$) and 100 g H type mordenite ("HM-23"). The sample contained 0.929 g of the catalyst per cm$^3$ of the honeycomb.

EXAMPLE A-22

Sample A-22 was prepared in the same manner as in Example A-4, except for using 10 g of the perovskite compound ($LaCoO_3$) and 100 g of H type mordenite ("HM-23"). The sample contained 0.948 g of the catalyst per cm$^3$ of the honeycomb.

EXAMPLE A-23

Sample A-23 was prepared in the same manner as in Example A-4, except for using 50 g of the perovskite compound ($LaCoO_3$) and 100 g of H type mordenite ("HM-23"). The sample contained 0.109 g of the catalyst per cm$^3$ of the honeycomb.

EXAMPLE A-24

Sample A-24 was prepared in the same manner as in Example A-4, except for using 50 g of the perovskite compound ($LaCoO_3$) and 50 g of the H type mordenite ("HM-23"). The sample contained 0.122 g of the catalyst per cm$^3$ of the honeycomb.

EXAMPLE A-25

A hundred grams of Na type mordenite represented by $Na_x[AlO_2)_x \cdot (SiO_2)_y] \cdot zH_2O$ ("ZSM-5" produced by Nippon Mobile Co., Ltd.; y/x=35) were dipped in 1 l of a 0.025 mol/l $TiOSO_4$ aqueous solution, and the system was thoroughly stirred. The mixture was heated in an autoclave with stirring at a rate of temperature rise of 100° C./hr up to 125° C., at which the mixture was kept for 1 hour to hydrolyze $TiOSO_4$ and to exchange the Na ion for a Ti ion. The solid was collected by filtration, washed with water, dried, and calcined at 650° C. for 4 hours to obtain zeolite. The resulting zeolite (Ti-ZSM-5) had a $TiO_2$ content of 2.4%.

Sample A-25 was prepared in the same manner as in Example A-4, except for replacing the H type mordenite with the thus prepared Ti-ZSM-5. The sample contained 0.110 g of the catalyst per cm$^3$ of the honeycomb.

EXAMPLE A-26

In 500 ml of water were dissolved 173.49 g of yttrium nitrate tetrahydrate ($Y(NO_3)_3 \cdot 4H_2O$) and 145.52 g of cobalt nitrate hexahydrate. The resulting aqueous solution was adjusted to a pH of 10 by addition of a 121 g/l aqueous solution of sodium hydroxide with thorough stirring. After a precipitate was formed, the stirring was further continued for an additional period of 18 hours for maturing. The precipitate was repeatedly filtered, washed with water, and repulped until the filtrate had substantially the same conductivity as that of repulping water. The resulting filter cake was dried at 120° C. for 18 hours and then calcined at 700° C. for 3 hours.

The X-ray diffractometry of the resulting calcined product revealed formation of a perovskite crystal phase. The calcined product ($YCoO_3$) had a specific surface area of 18.5 m$^2$/g.

Thirty grams of the resulting perovskite compound were mixed with 100 g of H type mordenite ("HM-23"), and 100 g of water was added thereto. The mixture was ground in a planetary mill for 30 minutes, and the viscosity of the mixture was adjusted with water to prepare a wash coating slurry. The slurry was coated on a honeycomb to obtain sample A-26 having 0.102 g of the catalyst per cm$^3$ of the honeycomb.

EXAMPLE A-27

A perovskite compound ($LaCo_{0.8}Mn_{0.2}O_3$) was obtained in the same manner as in Example A-1, except for using 89.5 g of lanthanum nitrate hexahydrate, 41.19 g of cobalt acetate tetrahydrate, and 10.13 g of manganese acetate tetrahydrate. The resulting perovskite compound had a specific surface area of 24.8 m$^2$/g.

To a mixture of 30 g of the perovskite compound and 100 g of γ-alumina ("A-11") was added 100 g of water, and the slurry was coated on a honeycomb to prepare sample A-27 having 0.106 g of the catalyst per cm$^3$ of the honeycomb.

EXAMPLE A-28

A perovskite compound ($La_{0.4}Y_{0.4}Sr_{0.2}Co_{0.8}Mn_{0.2}O_3$) was obtained in the same manner as in Example A-26, except for using 135.80 g of lanthanum nitrate hexahydrate, 108.82 g of yttrium nitrate tetrahydrate, 41.19 g of strontium nitrate, 156.23 g of cobalt acetate tetrahydrate, and 38.43 g of manganese acetate tetrahydrate. The resulting perovskite compound had a specific surface area of 20.4 m$^2$/g.

To a mixture of 30 g of the perovskite compound and 100 g of γ-alumina ("A-11") was added 100 g of water, and the slurry was coated on a honeycomb to prepare sample A-28 having 0.111 g of the catalyst per cm$^3$ of the honeycomb.

EXAMPLE A-29

A perovskite compound ($La_{0.2}Y_{0.4}Ce_{0.4}CrO_3$) was obtained in the same manner as in Example A-26, except for using 17.90 g of lanthanum nitrate hexahydrate, 28.69 g of yttrium nitrate tetrahydrate, 35.90 g of cerium nitrate hexahydrate ($Ce(NO_3)_3 \cdot 6H_2O$), and 49.22 g of chromium nitrate and conducting calcination at 800° C. for 3 hours. The resulting perovskite compound had a specific surface area of 21.6 m$^2$/g.

To a mixture of 30 g of the perovskite compound and 100 g of H type mordenite ("HM-23") was added 100 g of water, and the slurry was coated on a honeycomb to prepare sample A-29 having 0.098 g of the catalyst per cm$^3$ of the honeycomb.

EXAMPLE A-30

A perovskite compound ($Ce_{0.8}Ba_{0.2}Cu_{0.5}Cr_{0.5}O_3$) was obtained in the same manner as in Example A-26, except for using 70.65 g of cerium nitrate hexahydrate, 10.63 g of barium nitrate, 24.57 g of cupric nitrate trihydrate, and 24.22 g of chromium nitrate. The resulting perovskite compound had a specific surface area of 19.3 m$^2$/g.

To a mixture of 30 g of the perovskite compound and 100 g of H type mordenite ("HM-23") was added 100 g of water, and the slurry was coated on a honeycomb to-prepare sample A-30 having 0.126 g of the catalyst per cm$^3$ of the honeycomb.

EXAMPLE A-31

A perovskite compound ($La_{0.8}Ce_{0.2}Mn_{0.5}Ti_{0.5}O_3$) was obtained in the same manner as in Example A-26, except for using 72.67 g of lanthanum nitrate hexahydrate, 18.22 g of cerium nitrate hexahydrate, 25.71 g of manganese acetate tetrahydrate, and 339.0 ml of a titanium tetrachloride aqueous solution (Ti content: 14.82 g/100 ml). The resulting perovskite compound had a specific surface area of 23.1 m$^2$/g.

To a mixture of 10 g of the perovskite compound and 100 g of silica-alumina ("COK-84") was added 100 g of water, and the slurry was coated on a honeycomb to prepare sample A-31 having 0.095 g of the catalyst per cm$^3$ of the honeycomb.

EXAMPLE A-32

A perovskite compound ($La_{0.4}Y_{0.4}Sr_{0.2}Ni_{0.8}Fe_{0.2}O_3$) was obtained in the same manner as in Example A-26, except for using 101.05 g of lanthanum nitrate hexahydrate, 80.97 g of yttrium nitrate tetrahydrate, 24.69 g of strontium nitrate, 135.72 g of nickel nitrate hexahydrate ($Ni(NO_3)_2 \cdot 6H_2O$), and 33.60 g of ferrous nitrate hexahydrate. The resulting perovskite compound had a specific surface area of 24.0 m$^2$/g.

To a mixture of 30 g of the perovskite compound and 100 g of γ-alumina ("A-11") was added 100 g of water, and the slurry was coated on a honeycomb to prepare sample A-32 having 0.099 g of the catalyst per cm$^3$ of the honeycomb.

EXAMPLE A-33

A perovskite compound ($La_{0.6}Y_{0.2}Ag_{0.2}Cu_{0.8}Zr_{0.2}O_3$) was obtained in the same manner as in Example A-26, except for using 151.58 g of lanthanum nitrate hexahydrate, 40.49 g of yttrium nitrate tetrahydrate, 19.82 g of silver nitrate, 112.77 g of cupric nitrate trihydrate, and 69.87 g of zirconium nitrate pentahydrate. The resulting perovskite compound had a specific surface area of 17.8 m$^2$/g.

Thirty grams of the perovskite compound were mixed with 100 g of zirconium oxide prepared in the same manner as in Example A-13, and 100 g of water was added thereto. The resulting slurry was coated on a honeycomb to prepare sample A-33 having 0.094 g of the catalyst per cm$^3$ of the honeycomb.

EXAMPLE A-34

In 500 ml of water were dissolved 44.16 g of cerium nitrate hexahydrate, 35.29 g of yttrium nitrate tetrahydrate, 10.76 g of strontium nitrate, and 58.57 g of ferrous nitrate hexahydrate. The resulting aqueous solution was adjusted to a pH of 10 by addition of a 121 g/l aqueous solution of sodium hydroxide with thorough stirring. After a precipitate was formed, the stirring was further continued for an additional period of 18 hours for maturing. The precipitate was repeatedly filtered, washed with water, and repulped until the filtrate had substantially the same conductivity as that of repulping water. The resulting filter cake was dried at 120° C. for 18 hours.

The dried product was ground, and 25.90 ml of a vanadyl oxalate aqueous solution (V content: 100 g/l) was added thereto, followed by thoroughly kneading. The blend was evaporated to dryness, dried at 120° C. for 18 hours, and calcined at 850° C. for 3 hours to obtain a perovskite compound ($Ce_{0.4}Y_{0.4}Sr_{0.2}Fe_{0.8}V_{0-}$ .2O3). The resulting perovskite compound had a specific surface area of 13.7 m$^2$/g.

To a mixture of 30 g of the perovskite compound and 100 g of silica-zirconia prepared in the same manner as in Example A-14 was added 100 g of water, and the mixture was ground in a planetary mill for 30 minutes and diluted with water to prepare a wash coating slurry. The slurry was coated on a honeycomb to prepare sample A-34 having 0.124 g of the catalyst per cm$^3$ of the honeycomb.

EXAMPLE A-35

In 1000 ml of water were dissolved 173.20 g of lanthanum nitrate hexahydrate, 126.98 g of strontium nitrate, 276.48 g of cupric nitrate trihydrate, and 25.90 g of chloroplatinic acid hexahydrate. The resulting aqueous solution was adjusted to a pH of 10 by addition of a 121 g/l aqueous solution of sodium hydroxide with thorough stirring. After the hydrolysis reaction, the stirring was further continued for an additional period of 18 hours for maturing. The mixture was worked-up in the same manner as in Example A-26 to obtain a perovskite compound (La$_{0.4}$Sr$_{0.6}$Cu$_{0.95}$Pt$_{0.05}$O$_3$). The resulting perovskite compound had a specific surface area of 27.6 m$^2$/g.

To a mixture of 30 g of the perovskite compound and 100 g of H type mordenite ("HM-23") was added 100 g of water, and the mixture was ground in a planetrary mill for 30 minutes. The viscosity of the slurry was adjusted with water to prepare a wash coating slurry. The slurry was coated on a honeycomb to prepare sample A-35 having 0.123 g of the catalyst per cm$^3$ of the honeycomb.

EXAMPLE A-36

Sample A-36 was prepared in the same manner as in Example A-26, except for replacing the H type mordenite with Ti-ZSM-5 prepared in the same manner as in Example A-25. The sample contained 0.116 g of the catalyst per cm$^3$ of the honeycomb.

EXAMPLE A-37

Preparation of Perovskite Compound

In 250 ml of water were dissolved 72.67 g of lanthanum nitrate hexahydrate, 4.24 g of potassium nitrate (KNO$_3$), 50.39 g of manganese acetate tetrahydrate, and 1.36 g of rhodium nitrate dihydrate. The aqueous solution was evaporated to dryness in a spray drier ("GB-22" manufactured by Yamato Kagaku Co., Ltd.), and the residue was calcined at 700° C. for 3 hours to obtain a perovskite compound (La$_{0.8}$K$_{0.2}$Mn$_{0.98}$Rh$_{0.02}$O$_3$). The resulting perovskite compound had a specific surface area of 18.3 m$^2$/g.

Preparation of H-Fe Silicate

To a mixture of 162 g of 50% silica sol and 500 g of water was added dropwise a solution of 9.23 g of ferric nitrate (Si/Fe atomic ratio: 60) in 200 g of water and was then added dropwise a solution of 22.26 g of potassium hydroxide in 200 g of water. The dropwise addition of each solution was conducted with stirring over about 30 minutes. In the resulting mixture was further dissolved 35.19 g of tetrapropylammonium bromide. The mixture was stirred in an autoclave at 160° C. for 16 hours. The reaction product was collected by filtration, washed with water, dried, and calcined in air at 500° C. for 3 hours to obtain ZSM-5 type Fe silicate (K-exchanged).

Thirty grams of the Fe silicate were added to 500 ml of a 0.5 mol/l aqueous solution of ammonium nitrate, and the mixture was stirred on an oil bath at 60° C. for 3 hours, followed by filtration. This operation was repeated two more times. The filter cake was washed with water, dried, and calcined in air at 500° C. for 3 hours to obtain proton type Fe silicate (H—Fe silicate).

To a mixture of 45 g of the perovskite compound and 55 g of the H—Fe silicate was added 100 g of water, and the mixture was ground in a planetary mill for 30 minutes. The viscosity of the mixture was adjusted with water to prepare a wash coating slurry. The slurry was coated on a honeycomb to obtain sample A-37 having 0.179 g of the catalyst per cm$^3$ of the honeycomb.

EXAMPLE A-38

A perovskite compound (La$_{0.9}$Na$_{0.1}$CoO$_3$) was prepared in the same manner as in Example A-37, except for using 72.67 g of lanthanum nitrate hexahydrate, 1.58 g of sodium nitrate (NaNO$_3$), and 54.27 g of cobalt nitrate hexahydrate. The resulting perovskite compound had a specific surface area of 13.5 m$^2$/g.

To a mixture of 40 g of the perovskite compound and 60 g of H type mordenite ("HM-23") was added 100 g of water, and the mixture was ground in a planetary mill for 30 minutes. The viscosity of the mixture was adjusted with water to prepare a wash coating slurry. The slurry was coated on a honeycomb to obtain sample A-38 having 0.153 g of the catalyst per cm$^3$ of the honeycomb.

EXAMPLE A-39

A perovskite compound (La$_{0.9}$Bi$_{0.1}$Li$_{0.6}$Pt$_{0.4}$O$_3$) was prepared in the same manner as in Example A-37, except for using 72.67 g of lanthanum nitrate hexahydrate, 9.05 g of bismuth nitrate pentahydrate (Bi(NO$_3$)$_3$·5-H$_2$O), 7.71 g of lithium nitrate (LiNO$_3$), 38.63 g of chloroplatinic acid hexahydrate, and 500 ml of Water. The resulting perovskite compound had a specific surface area of 20.7 m$^2$/g.

Preparation of La-Silicate

H-La silicate was prepared in the same manner as in Example A-37, except for replacing ferric nitrate with 11.27 g of lanthanum nitrate (Si/La atomic ratio: 30).

To a mixture of 25 g of the perovskite compound and 75 g of the H-La silicate was added 100 g of water, and the mixture was ground in a planetary mill for 30 minutes. The viscosity of the mixture was adjusted with water to prepare a wash coating slurry. The slurry was coated on a honeycomb to obtain sample A-39 having 0.174 g of the catalyst per cm$^3$ of the honeycomb.

EXAMPLE A-40

To a mixture of 72.67 g of lanthanum nitrate hexahydrate, 10.30 g of thorium nitrate tetrahydrate (Th(NO$_3$)$_4$·4H$_2$O), 4.50g of cupric nitrate trihydrate, 48.33 g of ferric nitrate hexahydrate (Fe(NO$_3$)$_3$·6H$_2$O), and 66 g of H type mordenite ("HM-23") was added 300 ml of water, and the mixture was thoroughly stirred. The resulting slurry was evaporated to dryness in a spray drier ("GB-22"), and the residue was calcined at 800° C. for 3 hours. The calcined product had a specific surface area of 241.3 m$^2$/g.

To 100 g of the calcined product was added 100 g of water, and the mixture was ground in a planetary mill for 30 minutes. The viscosity of the mixture was adjusted with water to prepare a wash coating slurry. The slurry was coated on a honeycomb to obtain sample A-40 having 0.135 g of the catalyst per cm$^3$ of the honeycomb.

EXAMPLE A-41

To a mixture of 72.67 g of lanthanum nitrate hexahydrate, 32.44 g of cupric nitrate trihydrate, and 7.42 g of tantalum oxide ($Ta_2O_5$) was added 250 ml of water, and the mixture was thoroughly stirred. The resulting slurry was evaporated to dryness in a spray drier ("GB-22"), and the residue was calcined at 800° C. for 3 hours to obtain a perovskite compound ($LaCu_{0.8}Ta_{0.2}O_3$) having a specific surface area of 9.2 m$^2$/g.

To a mixture of 40 g of the resulting perovskite compound and 60 g of H type mordenite ("HM-23") was added 100 g of water, and the mixture was ground in a planetary mill for 30 minutes. The viscosity of the mixture was adjusted with water to prepare a wash coating slurry. The slurry was coated on a honeycomb to obtain sample A-41 having 0.186 g of the catalyst per cm$^3$ of the honeycomb.

EXAMPLE A-42

In 500 ml of water were dissolved 224.02 g of praseodymium chloride heptahydrate ($PrCl_3 \cdot 7H_2O$), 132.48 g of lead nitrate, and 245.09 g of manganese acetate tetrahydrate. The resulting aqueous solution was adjusted to a pH of 10 by addition of a 121 g/l aqueous solution of sodium hydroxide with thorough stirring. After a precipitate was formed, the stirring was further continued for an additional period of 18 hours for maturing. The precipitate was repeatedly filtered, washed with water, and repulped until the filtrate had substantially the same conductivity as that of repulping water. The resulting filter cake was dried at 120° C. for 18 hours and then calcined at 700° C. for 3 hours.

The X-ray diffractometry of the resulting calcined product revealed formation of a perovskite crystal phase. The calcined product had a specific surface area of 25.9 m$^2$/g ($Pr_{0.8}Pb_{0.4}MnO_3$).

Forty grams of the resulting perovskite compound were mixed with 60 g of H type mordenite ("HM-23"), and 100 g of water was added thereto. The mixture was ground in a planetary mill for 30 minutes. The viscosity of the mixture was adjusted with water to prepare a wash coating slurry. The slurry was coated on a honeycomb to obtain sample A-42 having 0.118 g of the catalyst per cm$^3$ of the honeycomb.

EXAMPLE A-43

A perovskite compound ($Nd_{0.6}Pb_{0.4}MnO_3$) was obtained in the same manner as in Example A-42, except for using 263.01 g of neodymium nitrate hexahydrate ($Nd(NO_3)_3 \cdot 6H_2O$), 132.48 g of lead nitrate, and 245.09 g of manganese acetate tetrahydrate. The resulting perovskite compound had a specific surface area of 30.7 m$^2$/g.

Forty grams of the resulting perovskite compound were mixed with 60 g of H type mordenite ("HM-23"), and 100 g of water was added thereto to prepare a slurry. The slurry was coated on a honeycomb to obtain sample A-43 having 0.133 g of the catalyst per cm$^3$ of the honeycomb.

EXAMPLE A-44

A perovskite compound ($Gd_{0.6}Pb_{0.4}MnO_3$) was obtained in the same manner as in Example A-42, except for using 270.82 g of gadolinium nitrate hexahydrate ($Gd(NO_3)_3 \cdot 6H_2O$), 132.48 g of lead nitrate, and 245.09 g of manganese acetate tetrahydrate, and conducting calcination at 700° C. for 3 hours. The resulting perovskite compound had a specific surface area of 24.2 m$^2$/g.

Forty grams of the resulting perovskite compound were mixed with 60 g of H type mordenite ("HM-23"), and 100 g of water was added thereto to prepare a slurry. The slurry was coated on a honeycomb to obtain sample A-44 having 0.127 g of the catalyst per cm$^3$ of the honeycomb.

EXAMPLE A-45

A perovskite compound ($SmCoO_3$) was obtained in the same manner as in Example A-42, except for using 230.97 g of samarium nitrate hexahydrate ($Sm(NO_3)_3 \cdot 6H_2O$) and 291.03 g of cobalt nitrate hexahydrate and conducting calcination at 800° C. for 3 hours. The resulting perovskite compound had a specific surface area of 16.4 m$^2$/g.

Forty grams of the resulting perovskite compound were mixed with 60 g of H type mordenite ("HM-23"), and 100 g of water was added thereto to prepare a slurry. The slurry was coated on a honeycomb to obtain sample A-45 having 0.112 g of the catalyst per cm$^3$ of the honeycomb.

EXAMPLE A-46

A perovskite compound ($Eu_{0.8}Ba_{0.2}CoO_3$) was obtained in the same manner as in Example A-45, except for using 354.6.8 g of europium nitrate hexahydrate ($Eu(NO_3)_3 \cdot 6H_2O$), 52.27 g of barium nitrate, and 291.03 g of cobalt nitrate hexahydrate. The resulting perovskite compound had a specific surface area of 18.5 m$^2$/g.

Thirty grams of the resulting perovskite compound were mixed with 100 g of H type mordenite ("HM-23"), and 100 g of water was added thereto to prepare a slurry. The slurry was coated on a honeycomb to obtain sample A-46 having 0.119 g of the catalyst per cm$^3$ of the honeycomb.

COMPARATIVE EXAMPLE A-1

Sample W-1 was prepared in the same manner as in Example A-1, except for using no activated titanium oxide. Sample W-1 had 0.132 g of the catalyst per cm$^3$ of the honeycomb.

COMPARATIVE EXAMPLE A-2

Na type mordenite (a product of Nippon Mobile Co., Ltd.; $SiO_2/Al_2O_3$ molar ratio: 34) was treated in the same manner as in Example A-2 to obtain sample W-2 (H type ZSM-5). Sample W-2 contained 0.128 g of the catalyst per cm$^3$ of the honeycomb.

Each of samples A-1 to A-46 and comparative samples W-1 and W-2 was evaluated for its catalysis in reduction of nitrogen oxide as follows. A nitrogen oxide-containing gas was catalytically reduced with a reducing agent shown in Table 1 below in the presence of each sample. A conversion of nitrogen monoxide to $N_2$ was calculated from $N_2$ amount as measured by gas chromatography.

Test Conditions:
 1) Gas Composition:
  NO: 1% by volume
  $O_2$: 10% by volume
  Reducing agent: 1% by volume
  He: balance
 2) Space Velocity: 20000 hr$^{-1}$ 3) Reaction Temperature: 300° C., 400° C., 500° C., or 600° C.

The results obtained are shown in Table 1.

TABLE 1

| Catalyst | Reducing Agent | Nitrogen Conversion (%) | | | |
|---|---|---|---|---|---|
| | | 300° C. | 400° C. | 500° C. | 600° C. |
| A-1 | propane | 87.1 | 96.9 | 88.6 | 64.4 |
| | propylene | 98.4 | 95.2 | 78.6 | 41.5 |
| | 1,3-butadiene | 95.6 | 92.0 | 78.0 | 32.3 |
| | ethanol | 96.1 | 90.3 | 45.8 | 26.6 |
| A-2 | propane | 75.0 | 89.7 | 83.4 | 64.4 |
| A-3 | propane | 67.4 | 75.7 | 87.8 | 75.0 |
| A-4 | propane | 96.1 | 98.3 | 92.5 | 72.0 |
| | isobutane | 92.6 | 97.7 | 90.0 | 68.4 |
| | propylene | 100 | 99.2 | 84.6 | 73.8 |
| | trans-2-butene | 97.3 | 94.1 | 80.2 | 61.5 |
| A-5 | propane | 82.8 | 91.1 | 79.1 | 63.2 |
| A-6 | propane | 51.5 | 78.1 | 85.1 | 72.5 |
| A-7 | propane | 63.9 | 91.3 | 82.8 | 72.7 |
| | 2-butanol | 94.8 | 84.4 | 61.9 | 32.6 |
| A-8 | propane | 90.4 | 95.6 | 86.6 | 78.1 |
| A-9 | propane | 90.9 | 92.5 | 86.4 | 67.6 |
| A-10 | propane | 92.3 | 94.3 | 78.2 | 64.0 |
| A-11 | cyclobutane | 98.4 | 91.1 | 87.0 | 78.7 |
| | ethylene glycol | 99.1 | 88.9 | 66.4 | 50.6 |
| A-12 | propane | 94.2 | 94.7 | 88.0 | 71.1 |
| A-13 | propane | 84.3 | 95.0 | 82.7 | 64.7 |
| A-14 | propane | 72.4 | 88.1 | 92.2 | 88.7 |
| | propylene | 90.5 | 98.7 | 86.8 | 62.8 |
| | 1-propanol | 95.2 | 87.8 | 74.0 | 41.5 |
| W-1 | propane | 0 | 0 | 0 | 0 |
| W-2 | propane | 8.4 | 13.7 | 21.1 | 18.6 |
| A-15 | propane | 91.0 | 84.3 | 69.3 | 49.1 |
| A-16 | propane | 94.2 | 87.5 | 55.2 | 39.9 |
| A-17 | propane | 90.3 | 89.4 | 74.8 | 54.6 |
| A-18 | propane | 92.9 | 84.8 | 54.7 | 43.2 |
| A-19 | propylene | 89.4 | 81.2 | 68.1 | 43.5 |
| A-20 | propane | 91.3 | 86.5 | 62.8 | 36.7 |
| A-21 | propylene | 71.5 | 78.9 | 67.3 | 42.0 |
| A-22 | propylene | 92.6 | 86.8 | 77.2 | 63.4 |
| A-23 | propylene | 99.2 | 98.4 | 87.6 | 69.8 |
| A-24 | propylene | 94.1 | 88.5 | 70.0 | 44.9 |
| A-25 | propylene | 99.1 | 97.2 | 83.7 | 65.4 |
| A-26 | propane | 84.9 | 93.5 | 85.1 | 61.2 |
| | propylene | 97.2 | 93.8 | 77.0 | 39.4 |
| | 1,3-butadiene | 93.8 | 91.1 | 76.2 | 30.5 |
| | ethanol | 95.2 | 88.9 | 44.3 | 20.8 |
| A-27 | propane | 78.7 | 92.4 | 86.2 | 67.0 |
| A-28 | propane | 75.1 | 91.6 | 83.3 | 62.9 |
| A-29 | propane | 69.5 | 90.2 | 81.1 | 54.7 |
| | isobutane | 74.8 | 93.0 | 85.5 | 48.6 |
| | propylene | 77.2 | 95.8 | 79.4 | 23.1 |
| | trans-2-butene | 95.3 | 82.6 | 55.6 | 16.0 |
| A-30 | propane | 53.1 | 85.2 | 81.4 | 52.5 |
| A-31 | propane | 52.3 | 78.9 | 83.5 | 60.9 |
| A-32 | propane | 71.4 | 90.8 | 88.3 | 64.1 |
| | 2-butanol | 92.3 | 74.9 | 54.5 | 25.3 |
| A-33 | propane | 68.2 | 82.0 | 79.8 | 46.7 |
| A-34 | propane | 74.9 | 86.2 | 79.7 | 48.3 |
| A-35 | propane | 93.1 | 90.2 | 73.9 | 52.6 |
| A-36 | cyclobutane | 92.0 | 91.1 | 74.2 | 48.9 |
| | ethylene glycol | 93.6 | 87.4 | 52.7 | 20.0 |
| A-37 | propane | 61.0 | 64.4 | 36.9 | 28.6 |
| A-38 | propylene | 73.1 | 89.2 | 64.5 | 33.4 |
| A-39 | propylene | 78.4 | 59.9 | 23.6 | 10.8 |
| A-40 | propylene | 57.9 | 60.4 | 49.8 | 22.5 |
| A-41 | propylene | 42.7 | 53.7 | 31.7 | 29.2 |
| A-42 | propylene | 98.5 | 94.8 | 78.2 | 44.3 |
| A-43 | propylene | 99.6 | 96.3 | 81.1 | 49.4 |
| A-44 | propylene | 97.1 | 93.3 | 76.4 | 38.6 |
| A-45 | propylene | 95.0 | 91.2 | 72.6 | 34.3 |
| A-46 | propylene | 95.7 | 91.6 | 72.5 | 33.0 |

As is apparent from Table 1, each of the catalysts according to the present invention (samples A-1 to 46) achieves a high conversion of nitrogen oxide to nitrogen, whereas the comparative catalysts (sample W-1 and 2) exhibit no or small catalyzing activity.

EXAMPLE B-1

In 500 ml of water were dissolved 353.68 g of lanthanum nitrate hexahydrate and 98.67 g of cupric nitrate trihydrate. The resulting aqueous solution was adjusted to a pH of 10 by addition of a 121 g/l aqueous solution of sodium hydroxide with thorough stirring. After the neutralizing reaction, the stirring was further continued for an additional period of 18 hours for maturing. The precipitate was repeatedly filtered, washed with water, and repulped until the filtrate had substantially the same conductivity as that of repulping water. The resulting filter cake was dried at 120° C. for 18 hours and then calcined at 800° C. for 3 hours.

The X-ray diffractometry of the resulting calcined product revealed formation of a perovskite crystal phase. The calcined product had a specific surface area of 13.4 m$^2$/g (La$_{2.0}$CuO$_4$).

Sixty grams of the resulting perovskite-containing compound were mixed with 100 g of H type mordenite ("HM23"), and 100 g of water was added thereto. The mixture was ground in a planetary mill for 30 minutes. The viscosity of the mixture was adjusted with water to prepare a wash coating slurry. The slurry was coated on a honeycomb to obtain sample B-1 having 0.129 g of the catalyst per cm$^3$ of the honeycomb.

EXAMPLE B-2

A perovskite-containing compound (La$_{1.4}$Pb$_{0.6}$CuO$_4$) was obtained in the same manner as in Example B-1, except for using 125.3 g of lanthanum nitrate hexahydrate, 41.08 g of lead nitrate, and 49.94 g of cupric nitrate trihydrate. The resulting perovskite-containing compound had a specific surface area of 11.6 m$^2$/g.

Sixty grams of the resulting perovskite-containing compound were mixed with 100 g of H type mordenite ("HM23"), and 100 g of water was added thereto to prepare a slurry. The slurry was coated on a honeycomb to obtain sample B-2 having 0.133 g of the catalyst per cm$^3$ of the honeycomb.

EXAMPLE B-3

A perovskite-containing compound (Nd$_{2.0}$CuO$_4$) was obtained in the same manner as in Example B-1, except for using 249.63 g of neodymium nitrate hexahydrate and 68.79 g of cupric nitrate trihydrate. The resulting perovskite-containing compound had a specific surface area of 19.4 m$^2$/g.

Sixty grams of the resulting perovskite-containing compound were mixed with 100 g of H type mordenite ("HM-23"), and 100 g of water was added thereto. The resulting slurry was coated on a honeycomb to obtain sample B-3 having 0.130 g of the catalyst per cm$^3$ of the honeycomb.

EXAMPLE B-4

A perovskite-containing compound (La$_{1.5}$Zn$_{0.5}$Cu$_{0.95}$Ti$_{0.05}$O$_4$) was obtained in the same manner as in Example B-1, except for using 273.2 g of praseodymium nitrate heptahydrate, 59.38 g of lead nitrate trihydrate, 117.86 g of cupric nitrate trihydrate, and 11.82 ml of a titanium tetrachloride aqueous solution (Ti content: 14.82 g/100 ml). The resulting perovskite-containing compound had a specific surface area of 15.8 m$^2$/g.

Sixty grams of the resulting perovskite-containing compound were mixed with 100 g of silica-alumina ("COK-84"), and 100 g of water was added thereto. The resulting slurry was coated on a honeycomb to obtain sample B-4 having 0.097 g of the catalyst per cm$^3$ of the honeycomb.

EXAMPLE B-5

Preparation of Perovskite-Containing Compound

To a mixture of 500.0 ml of an ethanol solution of yttrium ethoxide (Y$_2$O$_3$ content: 73 g/l), 156.86 ml of an ethanol solution of barium ethoxide (BaO content: 79 g/l), and 225.33 ml of an ethanol solution of nickel ethoxide (NiO content: 67 g/l), a 1% aqueous ammonia was slowly added dropwise while thoroughly stirring to conduct hydrolysis. The reaction mixture was evaporated to dryness while uniformly mixing, and the residue was calcined at 700° C. for 3 hours to obtain a perovskite-containing compound (Y$_{1.6}$Ba$_{0.4}$NiO$_4$). The perovskite-containing compound had a specific surface area of 26.6 m$^2$/g.

To a mixture of 60 g of the perovskite-containing compound and 100 g of SAPO-34 prepared in the same manner as in Example A-7 was added 100 g of water to prepare a slurry. The slurry was coated on a honeycomb to obtain sample B-5 having 0.132 g of the catalyst per cm$^3$ of the honeycomb.

EXAMPLE B-6

A perovskite-containing compound (La$_{0.8}$Ce$_{0.2}$Sr$_{1.0}$Cu$_{0.8}$Fe$_{0.2}$O$_4$) was obtained in the same manner as in Example B-1, except for using 202.10 g of lanthanum nitrate hexahydrate, 50.67 g of cerium nitrate hexahydrate, 123.47 g of strontium nitrate, 112.76 g of cupric nitrate trihydrate, and 33.60 g of ferrous nitrate hexahydrate. The resulting perovskite-containing compound had a specific surface area of 16.2 m$^2$/g.

To a mixture of 30 g of the perovskite-containing compound and 100 g of γ-alumina ("A-11") was added 100 g of water to prepare a slurry. The slurry was coated on a honeycomb to prepare sample B-6 having 0.144 g of the catalyst per cm$^3$ of the honeycomb.

EXAMPLE B-7

A perovskite-containing compound (La$_{1.6}$Gd$_{0.4}$Cu$_{0.9}$Co$_{0.1}$O$_4$) was obtained in the same manner as in Example B-1, except for using 404.10 g of lanthanum nitrate hexahydrate, 105.31 g of gadolinium nitrate, 126.83 g of cupric nitrate trihydrate, and 27.16 g of cobalt nitrate hexahydrate. The resulting perovskite-containing compound had a specific surface area of 17.2 m$^2$/g.

Sixty grams of the resulting perovskite-containing compound were mixed with 100 g of H type mordenite ("HM-23"), and 100 g of water was added thereto to prepare a slurry. The slurry was coated on a honeycomb to obtain sample B-7 having 0.126 g of the catalyst per cm$^3$ of the honeycomb.

EXAMPLE B-8

A perovskite-containing compound (La$_{1.0}$Pr$_{0.4}$Sr$_{0.4}$Ag$_{0.4}$Ni$_{0.8}$Zn$_{0.2}$O$_4$) was obtained in the same manner as in Example B-1, except for using 353.68 g of lanthanum nitrate hexahydrate, 121.99 g of praseodymium chloride, 69.14 g of strontium nitrate, 55.50 g of silver nitrate, 39.77 g of nickel nitrate hexahydrate, and 39.77 g of zinc nitrate pentahydrate. The resulting perovskite-containing compound had a specific surface area of 3.7.8 m$^2$/g.

To a mixture of 30 g of the perovskite-containing compound and 100 g of γ-alumina ("A-11") was added 100 g of water to prepare a washing coating slurry. The slurry was coated on a honeycomb to prepare sample B-8 having 0.119 g of the catalyst per cm$^3$ of the honeycomb.

EXAMPLE B-9

A perovskite-containing compound (La$_{1.0}$Sm$_{0.4}$Sr$_{0.6}$Cu$_{0.9}$Cr$_{0.1}$O$_4$) was prepared in the same manner as in Example B-1, except for using 353.68 g of lanthanum nitrate hexahydrate, 75.46 g of samarium nitrate (Sm(NO$_3$)$_3$), 103.71 g of strontium nitrate, 77.60 g of cupric nitrate trihydrate, and 19.45 g of chromium nitrate. The resulting perovskite-containing compound had a specific surface area of 28.1 m$^2$/g.

To a mixture of 60 g of the perovskite-containing compound and 100 g of ALPO-5 prepared in the same manner as in Example A-11 was added 100 g of water to prepare a slurry. The slurry was coated on a honeycomb to obtain sample B-9 having 0.128 g of the catalyst per cm$^3$ of the honeycomb.

EXAMPLE B-10

A perovskite-containing compound (La$_{1.4}$Eu$_{0.2}$Sr$_{0.4}$Cu$_{0.95}$Nb$_{0.05}$O$_4$) was obtained in the same manner as in Example B-1, except for using 134.73 g of lanthanum nitrate hexahydrate, 19.71 g of europium nitrate hexahydrate, 18.81 g of strontium nitrate, 51.01 g of cupric nitrate trihydrate, and 20.65 ml of a niobium pentachloride aqueous solution in a hydrochloric acid aqueous solution (Nb content: 50 g/l-HCl aqueous solution). The resulting perovskite-containing compound had a specific surface area of 20.1 m$^2$/g.

To a mixture of 25 g of the perovskite-containing compound and 100 g of MAPO-5 prepared in the same manner as in Example A-12 was added 100 g of water to prepare a slurry. The slurry was coated on a honeycomb to obtain sample B-10 having 0.137 g of the catalyst per cm$^3$ of the honeycomb.

EXAMPLE B-11

Sample B-11 was prepared in the same manner as in Example B-1, except for replacing H type mordenite with zirconium oxide prepared in the same manner as in Example A-13. Sample B-11 had 0.137 g of the catalyst per cm$^3$ of the honeycomb.

EXAMPLE B-12

In 500 ml of water were dissolved 353.68 g of lanthanum nitrate hexahydrate, 133.91 g of cupric nitrate trihydrate, and 151.70 g of bismuth hydroxide. The resulting aqueous solution was adjusted to a pH of 10 by addition of a 121 g/l aqueous solution of sodium hydroxide with thorough stirring. After the neutralization reaction, the stirring was further continued for an additional period of 18 hours for maturing. The precipitate was repeatedly filtered, washed with water, and repulped until the filtrate had substantially the same conductivity as that of repulping water. The resulting filter cake was dried at 120° C. for 18 hours.

The dried product was ground, and 14.86 ml of a vanadyl oxalate aqueous solution (V content: 100 g/l) was added thereto, followed by thoroughly kneading. The blend was evaporated to dryness, dried at 120° C. for 18 hours, and calcined at 850° C. for 3 hours to obtain a perovskite-containing compound (La$_{1.4}$Bi$_{0.6}$Cu$_{0.95}$V$_{0.05}$O$_4$). The resulting perovskite-containing compound had a specific surface area of 8.8 m$^2$/g.

To a mixture of 60 g of the perovskite-containing compound and 100 g of silica-zirconia prepared in the same manner as in Example A-14 was added 100 g of water, and the mixture was ground in a planetary mill for 30 minutes. The viscosity of the resulting slurry was adjusted with water to prepare a wash coating slurry. The slurry was coated on a honeycomb to obtain sample B-12 having 0.124 g of the catalyst per cm$^3$ of the honeycomb.

EXAMPLE B-13

A perovskite-containing compound ($La_{1.4}Bi_{0.6}Cu_{0.95}Mo_{0.05}O_4$) was prepared in the same manner as in Example B-12, except for replacing the vanadyl oxalate aqueous solution with 111.95 g of an aqueous ammonia solution of ammonium molybdate (Mo content: 25 g/l). The resulting perovskite-containing compound had a specific surface area of 10.2 m$^2$/g.

To a mixture of 60 g of the perovskite-containing compound and 100 g of Zr-mordenite prepared in the same manner as in Example A-15 was added 100 g of water, and the mixture was ground in a planetary mill for 30 minutes. The viscosity of the mixture was adjusted with water to prepare a wash coating slurry. The slurry was coated on a honeycomb to obtain sample B-13 having 0.137 g of the catalyst per cm$^3$ of the honeycomb.

EXAMPLE B-14

A perovskite-containing compound ($La_{1.4}Bi_{0.6}Cu_{0.95}W_{0.05}O_4$) was prepared in the same manner as in Example B-12, except for replacing the vanadyl oxalate aqueous solution with 6.76 g of an aqueous ammonia solution of ammonium metatungstate (WO$_3$ content: 50%). The resulting perovskite-containing compound had a specific surface area of 8.3 m$^2$/g.

To a mixture of 60 g of the perovskite-containing compound and 100 g of γ-alumina ("A-11") was added 100 g of water, and the mixture was ground in a planetary mill for 30 minutes. The viscosity of the mixture was adjusted with water to prepare a wash coating slurry. The slurry was coated on a honeycomb to obtain sample B-14 having 0.134 g of the catalyst per cm$^3$ of the honeycomb.

EXAMPLE B-15

In 1000 ml of water were dissolved 353.68 g of lanthanum nitrate hexahydrate, 115.94 g of lead nitrate, 133.91 g of copper nitrate trihydrate, and 15.11 g of chloroplatinic acid hexahydrate. The resulting aqueous solution was adjusted to a pH of 10 by addition of a 121 g/l aqueous solution of sodium hydroxide with thorough stirring. After the hydrolysis reaction, the mixture was further stirred for 18 hours. The reaction mixture was worked up in the same manner as in Example B-1 to obtain a perovskite-containing compound ($La_{1.4}Pb_{0.6}Cu_{0.95}Pt_{0.95}O_4$). The resulting perovskite-containing compound had a specific surface area of 24.1 m$^2$/g.

To a mixture of 60 g of the perovskite-containing compound and 100 g of Zr-mordenite prepared in the same manner as in Example A-15 was added 100 g of water, and the mixture was ground in a planetary mill for 30 minutes and diluted with water to prepare a wash coating slurry. The slurry was coated on a honeycomb to prepare sample B-15 having 0.116 g of the catalyst per cm$^3$ of the honeycomb.

EXAMPLE B-16

A perovskite-containing compound ($La_{1.4}Pb_{0.6}Cu_{0.95}Rh_{0.05}O_4$) was obtained in the same manner as in Example B-15, except for replacing chloroplatinic acid hexahydrate with 9.48 g of rhodium nitrate hexahydrate ($Rh(NO_3)_3 \cdot 6H_2O$). The resulting perovskite-containing compound had a specific surface area of 26.4 m$^2$/g.

To a mixture of 60 g of the perovskite-containing compound and 100 g of Zr-mordenite prepared in the same manner as in Example A-15 was added 100 g of water, and the mixture was ground in a planetary mill for 30 minutes and diluted with water to prepare a wash coating slurry. The slurry was coated on a honeycomb to prepare sample B-16 having 0.117 g of the catalyst per cm$^3$ of the honeycomb.

EXAMPLE B-17

A perovskite-containing compound ($La_{1.4}Pb_{0.6}Cu_{0.95}Pd_{0.05}O_4$) was obtained in the same manner as in Example B-15, except for replacing chloroplatinic acid hexahydrate with 5.17 g of palladium chloride. The resulting perovskite-containing compound had a specific surface area of 24.6 m$^2$/g.

To a mixture of 60 g of the perovskite-containing compound and 100 g of Zr-mordenite prepared in the same manner as in Example A-15 was added 100 g of water, and the mixture was ground in a planetary mill for 30 minutes and diluted with water to prepare a wash coating slurry. The slurry was coated on a honeycomb to prepare sample B-17 having 0.133 g of the catalyst per cm$^3$ of the honeycomb.

EXAMPLE B-18

A perovskite-containing compound ($La_{1.4}Pb_{0.6}Cu_{0.95}Ru_{0.05}O_4$) was obtained in the same manner as in Example B-15, except for replacing chloroplatinic acid hexahydrate with 9.71 g of ruthenium chloride pentahydrate. The resulting perovskite-containing compound had a specific surface area of 27.9 m$^2$/g.

To a mixture of 60 g of the perovskite-containing compound and 100 g of Zr-mordenite prepared in the same manner as in Example A-15 was added 100 g of water, and the mixture was ground in a planetary mill for 30 minutes and diluted with water to prepare a wash coating slurry. The slurry was coated on a honeycomb to prepare sample B-18 having 0,135 g of the catalyst per cm$^3$ of the honeycomb.

EXAMPLE B-19

Sample B-19 was obtained in the same manner as in Example B-1, except for using 1 g of the perovskite-containing compound ($La_{2.0}CuO_4$) and 100 g of the H type mordenite ("HM-23"). Sample B-19 had 0.096 g of the catalyst per cm$^3$ of the honeycomb.

EXAMPLE B-20

Sample B-20 was obtained in the same manner as in Example B-1, except for using 10 g of the perovskite-containing compound ($La_{2.0}CuO_4$). Sample B-20 had 0.107 g of the catalyst per cm$^3$ of the honeycomb.

EXAMPLE B-21

Sample B-21 was obtained in the same manner as in Example B-1, except for using 100 g of the perovskite-containing compound ($La_{2.0}CuO_4$). Sample B-21 had 0.129 g of the catalyst per cm$^3$ of the honeycomb.

EXAMPLE B-22

Sample B-22 was obtained in the same manner as in Example B-1, except for replacing the H type mordenite with Ti-ZSM-5 prepared in the same manner as in Example A-25. The sample had 0.124 g of the catalyst per cm³ of the honeycomb.

COMPARATIVE EXAMPLE B-1

Sample X-1 was prepared in the same manner as in Example B-1, except for using no H type mordenite. Sample X-1 had 0.134 g of the catalyst per cm³ of the honeycomb.

COMPARATIVE EXAMPLE B-2

Na type mordenite ($SiO_2/Al_2O_3$ molar ratio: 34) was treated in the same manner as in Example B-2 to obtain sample X-2. Sample X-2 had 0.128 g of the catalyst per cm³ of the honeycomb.

Samples B-1 to B-22 and comparative samples X-1 and X-2 were evaluated in the same manner as in Examples A-1 to A-46, except that the space velocity in gas chromatography was 30000 hr$^{-1}$. The results obtained are shown in Table 2 below.

TABLE 2

| Catalyst | Reducing Agent | Nitrogen Conversion (%) | | | |
|---|---|---|---|---|---|
| | | 300° C. | 400° C. | 500° C. | 600° C. |
| B-1 | propane | 51.9 | 72.0 | 91.8 | 70.1 |
| | propylene | 93.1 | 97.3 | 92.8 | 60.4 |
| | 1,3-butadiene | 86.4 | 97.3 | 90.6 | 55.3 |
| | ethanol | 95.5 | 92.1 | 86.8 | 54.1 |
| B-2 | propane | 61.5 | 80.3 | 94.4 | 78.2 |
| B-3 | propane | 92.0 | 96.7 | 93.4 | 79.5 |
| B-4 | propane | 61.2 | 71.5 | 94.5 | 64.4 |
| | isobutane | 53.3 | 83.0 | 92.4 | 55.3 |
| | propylene | 80.0 | 96.3 | 82.4 | 53.3 |
| | trans-2-butene | 70.5 | 96.3 | 82.4 | 48.8 |
| B-5 | propane | 63.4 | 80.2 | 92.5 | 77.9 |
| B-6 | propane | 62.1 | 80.8 | 93.7 | 75.3 |
| B-7 | propane | 57.1 | 73.3 | 91.2 | 72.0 |
| | 2-butanol | 92.1 | 80.9 | 76.2 | 40.8 |
| B-8 | propane | 62.9 | 81.5 | 92.7 | 71.3 |
| B-9 | propane | 73.9 | 85.5 | 94.9 | 63.6 |
| B-10 | propane | 62.4 | 82.3 | 88.9 | 74.9 |
| B-11 | ethylene glycol | 84.6 | 75.6 | 56.3 | 38.0 |
| B-12 | propane | 55.0 | 79.2 | 92.4 | 76.1 |
| B-13 | propane | 52.3 | 74.6 | 93.2 | 73.4 |
| B-14 | propane | 50.8 | 72.0 | 94.9 | 71.8 |
| | propylene | 87.2 | 96.6 | 82.8 | 55.0 |
| B-14 | 1-propanol | 92.8 | 82.9 | 67.8 | 30.0 |
| X-1 | propane | 0.0 | 0.0 | 0.0 | 0.0 |
| X-2 | propane | 5.2 | 8.6 | 13.5 | 10.1 |
| B-15 | propane | 83.9 | 96.2 | 86.6 | 51.8 |
| B-16 | propane | 82.8 | 96.8 | 84.2 | 50.8 |
| B-17 | propane | 77.5 | 94.5 | 85.0 | 54.9 |
| B-18 | propane | 74.8 | 94.7 | 84.8 | 51.5 |
| B-19 | propylene | 73.5 | 82.7 | 66.0 | 44.2 |
| B-20 | propylene | 82.1 | 91.9 | 83.4 | 54.6 |
| B-21 | propylene | 91.8 | 95.6 | 92.3 | 65.7 |
| B-22 | propylene | 91.1 | 96.5 | 93.0 | 64.1 |

As is apparent from Table 2, each of the catalysts according to the present invention (samples B-1 to 22) achieves a high conversion of nitrogen oxide to nitrogen, whereas the comparative catalysts (sample X-1 and 2) exhibit no or small catalysis.

EXAMPLE C-1

In 1000 ml of water were dissolved 101.05 g of lanthanum nitrate hexahydrate, 85.80 g of manganese acetate tetrahydrate, 322.45 g of strontium nitrate, and 407.49 g of cobalt nitrate hexahydrate.

To the resulting aqueous solution was added 100 g of a hydrogen peroxide aqueous solution, and a 121 g/l aqueous solution of sodium hydroxide was then added thereto with thorough stirring to adjust to a pH of 10. After the neutralization reaction, the stirring was further continued for an additional period of 18 hours for maturing. The precipitate was repeatedly filtered, washed with water, and repulped until the filtrate had substantially the same conductivity as that of repulping water. The resulting filter cake was dried at 120° C. for 18 hours and then calcined at 700° C. for 3 hours.

The X-ray diffractometry of the resulting calcined product revealed formation of a perovskite-containing crystal phase. The calcined product had a specific surface area of 21.8 m²/g ($La_{0.4}Sr_{2.6}Co_{2.4}Mn_{0.67}O_7$).

Thirty grams of the resulting perovskite-containing compound were mixed with 100 g of activated titanium oxide prepared in the same manner as in Example A-1, and 100 g of water was added thereto. The mixture was ground in a planetary mill for 30 minutes. The viscosity of the mixture was adjusted with water to prepare a wash coating slurry. The slurry was coated on a honeycomb to obtain sample C-1 having 0.972 g of the catalyst per cm³ of the honeycomb.

EXAMPLE C-2

A perovskite-containing compound ($YBa_2Cu_3O_7$) was obtained in the same manner as in Example C-1, except for using 173.49 g of yttrium nitrate tetrahydrate, 261.34 g of barium nitrate, and 362.4 g of cupric nitrate trihydrate. The resulting perovskite-containing compound had a specific surface area of 24.5 m²/g.

Thirty grams of the resulting perovskite-containing compound were mixed with 100 g of H type mordenite ("HM-23"), and 100 g of water was added thereto to prepare a slurry. The slurry was coated on a honeycomb to obtain sample C-2 having 0.094 g of the catalyst per cm³ of the honeycomb.

EXAMPLE C-3

A perovskite-containing compound ($La_{0.9}Pb_{2.1}Mn_3O_7$) was obtained in the same manner as in Example C-1, except for using 71.60 g of lanthanum nitrate hexahydrate, 127.79 g of lead nitrate, and 45.03 g of manganese acetate tetrahydrate, and calcining the mixture at 800° C. for 3 hours. The resulting perovskite-containing compound had a specific surface area of 23.7 m²/g.

Thirty grams of the resulting perovskite-containing compound were mixed with 100 g of H type mordenite ("HM-23"), and 100 g of water was added thereto to prepare a slurry. The slurry was coated on a honeycomb to obtain sample C-3 having 0.117 g of the catalyst per cm³ of the honeycomb.

EXAMPLE C-4

A perovskite-containing compound ($LaSrBaCo_3O_7$) was obtained in the same manner as in Example C-1, except for using 216.51 g of lanthanum nitrate hexahydrate, 105.82 g of strontium nitrate, 130.67 g of barium nitrate, and 436.55 g of cobalt nitrate hexahydrate, and calcining the mixture at 800° C. for 3 hours. The resulting perovskite-containing compound had a specific surface area of 19.9 m²/g.

Thirty grams of the resulting perovskite-containing compound were mixed with 100 g of H type mordenite ("HM-23"), and 100 g of water was added thereto to prepare a slurry. The slurry was coated on a honeycomb to obtain sample C-4 having 0.093 g of the catalyst per cm³ of the honeycomb.

EXAMPLE C-5

A perovskite-containing compound ($CeBa_2Ni_{1.5}Cr_{1.5}O_7$) was obtained in the same manner as in Example C-1, except for using 70.65 g of cerium nitrate hexahydrate, 85.04 g of barium nitrate, 70.97 g of nickel nitrate hexahydrate, and 58.12 g of chromium nitrate. The resulting perovskite-containing compound had a specific surface area of 21.7 m$^2$/g.

Thirty grams of the resulting perovskite-containing compound were mixed with 100 g of H type mordenite ("HM-23"), and 100 g of water was added thereto to prepare a slurry. The slurry was coated on a honeycomb to obtain sample C-5 having 0.098 g of the catalyst per cm$^3$ of the honeycomb.

EXAMPLE C-6

A perovskite-containing compound (LaBa$_{1.5}$Ca$_{0.5}$Mn$_{1.5}$Ti$_{1.5}$O$_7$) was obtained in the same manner as in Example C-1, except for using 90.84 g of lanthanum nitrate hexahydrate, 82.24 g of calcium nitrate tetrahydrate (Ca(NO$_3$)$_2$·4H$_2$O), 24.77 g of barium nitrate, 77.13 g of manganese acetate tetrahydrate, and 1017 ml of a titanium tetrachloride aqueous solution (Ti content: 14.82 g/100 ml). The resulting perovskite-containing compound had a specific surface area of 25.0 m$^2$/g.

Ten grams of the resulting perovskite-containing compound were mixed with 100 g of silica-alumina ("COK-84"), and 100 g of water was added thereto. The resulting slurry was coated on a honeycomb to obtain sample C-5 having 0.104 g of the catalyst per cm$^3$ of the honeycomb.

EXAMPLE C-7

To a mixture of 100.0 ml of an ethanol solution of lanthanum ethoxide (La$_2$O$_3$ content: 73 g/l), 239.14 ml of an ethanol solution of barium ethoxide (BaO content: 79 g/l), 149.85 ml of an ethanol solution of nickel ethoxide (NiO content: 67 g/l), and 9.22 ml of an ethanol solution of copper ethoxide (CuO content: 97 g/l), a 1% aqueous ammonia was slowly added dropwise while thoroughly stirring to conduct hydrolysis.

The reaction mixture was evaporated to dryness while uniformly mixing, and the residue was calcined at 600° C. for 3 hours to obtain a perovskite-containing compound (La$_{0.8}$Ba$_{2.2}$Cu$_{2.4}$Ni$_{0.6}$O$_7$). The perovskite-containing compound had a specific surface area 38.6 m$^2$/g.

To a mixture of 25 g of the perovskite-containing compound and 100 g of SAPO-34 prepared in the same manner as in Example A-7 was added 100 g of water to prepare a slurry. The slurry was coated on a honeycomb to obtain sample C-7 having 0.127 g of the catalyst per cm$^3$ of the honeycomb.

EXAMPLE C-8

A perovskite-containing compound (LaSr$_2$Co$_{2.4}$Cu$_{0.4}$Fe$_{0.2}$O$_7$) was prepared in the same manner as in Example C-1 except for using 101.05 g of lanthanum nitrate hexahydrate, 99.21 g of strontium nitrate, 163.73 g of cobalt nitrate hexahydrate, 22.55 g of cupric nitrate trihydrate, and 33.60 g of ferric nitrate hexahydrate. The resulting perovskite-containing compound had a specific surface area of 21.6 m$^2$/g.

To a mixture of 30 g of the perovskite-containing compound and 100 g of γ-alumina ("A-11") was added 100 g of water to prepare a slurry. The slurry was coated on a honeycomb to obtain sample C-8 having 0.090 g of the catalyst per cm$^3$ of the honeycomb.

EXAMPLE C-9

A perovskite-containing compound (YBa$_{1.5}$Zn$_{0.5}$Cu$_{2.0}$Co$_{1.0}$O$_7$) was prepared in the same manner as in Example C-1 except for using 101.22 g of yttrium nitrate tetrahydrate, 114.35 g of barium nitrate, 35.51 g of zinc nitrate hexahydrate, 84.90 g of cobalt nitrate hexahydrate, and 140.95 g of cupric nitrate trihydrate. The resulting perovskite-containing compound had a specific surface area of 21.8 m$^2$/g.

To a mixture of 30 g of the perovskite-containing compound and 100 g of γ-alumina ("A-11") was added 100 g of water to prepare a slurry. The slurry was coated on a honeycomb to obtain sample C-9 having 0.089 g of the catalyst per cm$^3$ of the honeycomb.

EXAMPLE C-10

A perovskite-containing compound (LaSr$_{1.8}$Ag$_{0.2}$Cr$_{2.4}$Zr$_{0.6}$O$_7$) was prepared in the same manner as in Example C-1 except for using 101.05 g of lanthanum nitrate hexahydrate, 88.90 g of strontium nitrate, 7.93 g of silver nitrate, 133.83 g of chromium nitrate, and 83.85 g of zirconium nitrate pentahydrate. The resulting perovskite-containing compound had a specific surface area of 18.2 m$^2$/g.

To a mixture of 30 g of the perovskite-containing compound and 100 g of γ-alumina ("A-11") was added 100 g of water to prepare a slurry. The slurry was coated on a honeycomb to obtain sample C-10 having 0.104 g of the catalyst per cm$^3$ of the honeycomb.

EXAMPLE C-11

A perovskite-containing compound (La$_{0.5}$Ce$_{0.5}$Sr$_{2.0}$Co$_{1.5}$Cr$_{1.5}$O$_7$) was prepared in the same manner as in Example C-1, except for using 50.53 g of lanthanum nitrate hexahydrate, 50.67 g of cerium nitrate hexahydrate, 98.78 g of strontium nitrate, 101.89 g of cobalt nitrate hexahydrate, and 83.37 g of chromium nitrate. The resulting perovskite-containing compound had a specific surface area of 19.7 m$^2$/g.

To a mixture of 30 g of the perovskite compound and 100 g of ALPO-5 prepared in the same manner as in Example A-11 was added 100 g of water to prepare a slurry. The slurry was coated on a honeycomb to obtain sample C-11 having 0.091 g of the catalyst per cm$^3$ of the honeycomb.

EXAMPLE C-12

A perovskite-containing compound (LaSr$_2$Fe$_2$NbO$_7$) was obtained in the same manner as in Example C-1, except for using 101.05 g of lanthanum nitrate hexahydrate, 98.77 g of strontium nitrate, 134.39 g of ferrous nitrate hexahydrate, and 433.61 ml of a solution of niobium pentachloride in a hydrochloric acid aqueous solution (Nb content: 50 g/l). The resulting perovskite-containing compound had a specific surface area of 18.5 m$^2$/g.

To a mixture of 25 g of the perovskite-containing compound and 100 g of MAPO-5 prepared in the same manner as in Example A-12 was added 100 g of water to prepare a slurry. The slurry was coated on a honeycomb to obtain sample C-12 having 0.089 g of the catalyst per cm$^3$ of the honeycomb.

EXAMPLE C-13

Sample C-13 was prepared in the same manner as in Example C-1, except for replacing activated titanium oxide with the same zirconium oxide as used in Example A-13. Sample C-13 had 0.128 g per cm$^3$ of the honeycomb.

EXAMPLE C-14

In 500 ml of water were dissolved 88.21 g of yttrium nitrate tetrahydrate, 107.64 g of strontium nitrate, and 151.98 g of cobalt acetate tetrahydrate. To the resulting aqueous solution was added dropwise a 121 g/l sodium hydroxide. aqueous solution to adjust to a pH of 10 while thoroughly stirring. After the hydrolysis reaction, the stirring was further continued for an additional period of 18 hours for maturing. The precipitate thus formed was repeatedly filtered, washed with water, and repulped until the filtrate had substantially the same conductivity as repulping water. The resulting filter cake was dried at 120° C. for 18 hours.

The dried product was ground, and 77.70 ml of a vanadyl oxalate aqueous solution (V content: 100 g/l) was added thereto, followed by thoroughly kneading. The blend was evaporated to dryness, dried at 120° C. for 18 hours, and calcined at 850° C. for 3 hours to obtain a perovskite-containing compound ($YSr_{2.0}Co_{2.4}V_{0.6}O_7$). The resulting perovskite-containing compound had a specific surface area of 12.8 $m^2/g$.

Thirty grams of the perovskite-containing compound were mixed with 100 g of silica-zirconia which was prepared in the same manner as in Example A-14 but had a specific surface area of 314 $m^2/g$, and 100 g of water was added thereto. The mixture was ground in a planetary mill for 30 minutes, and the viscosity was adjusted with water to prepare a wash coating slurry. The slurry was coated on a honeycomb to obtain sample C-14 having 0.118 g of the catalyst per $cm^3$ of the honeycomb.

EXAMPLE C-15

A perovskite-containing compound ($YSr_{2.0}Co_{2.4}Mo_{0.6}O_7$) was prepared in the same manner as in Example C-14, except for replacing the vanadyl oxalate aqueous solution with 780.66 ml of an aqueous ammonia solution of ammonium molybdate ($MoO_2$ content: 25 g/l). The resulting perovskite-containing compound had a specific surface area of 10.9 $m^2/g$.

Thirty grams of the perovskite-containing compound were mixed with 100 g of Zr-mordenite prepared in the same manner as in Example A-15, and 100 g of water was added thereto. The mixture was ground in a planetary mill for 30 minutes, and the viscosity was adjusted with water to prepare a wash coating slurry. The slurry was coated on a honeycomb to obtain sample C-15 having 0.103 g of the catalyst per $cm^3$ of the honeycomb.

EXAMPLE C-16

A perovskite-containing compound ($YSr_{2.0}Co_{2.4}W_{0.6}O_7$) was prepared in the same manner as in Example C-14, except for replacing the vanadyl oxalate aqueous solution with 70.74 g of an ammonium metatungstate aqueous solution ($WO_3$ content: 50%). The resulting perovskite-containing compound had a specific surface area of 12.9 $m^2/g$.

Thirty grams of the perovskite-containing compound were mixed with 100 g of γ-alumina ("A-11"), and 100 g of water was added thereto. The mixture was ground in a planetary mill for 30 minutes, and the viscosity was adjusted with water to prepare a wash coating slurry. The slurry was coated on a honeycomb to obtain sample C-16 having 0.131 g of the catalyst per $cm^3$ of the honeycomb.

EXAMPLE C-17

In 1000 ml of water were dissolved 88.21 g of lanthanum nitrate hexahydrate, 86.22 g of strontium nitrate, 142.73 g of cupric nitrate trihydrate, and 1.06 g of chloroplatinic acid hexahydrate. To the resulting aqueous solution was added dropwise a 121 g/l sodium hydroxide aqueous solution to adjust to a pH of 10 while thoroughly stirring. After the hydrolysis reaction, the stirring was further continued for an additional period of 18 hours for maturing. The reaction mixture was worked up in the same manner as in Example C-1 to obtain a perovskite-containing compound ($LaSr_{2.0}Cu_{2.99}Pt_{0.01}O_7$) having a specific surface area of 23.6 $m^2/g$.

Thirty grams of the perovskite-containing compound were mixed with 100 g of γ-alumina ("A-11"), and 100 g of water was added thereto. The mixture was ground in a planetary mill for 30 minutes, and the viscosity was adjusted with water to prepare a wash coating slurry. The slurry was coated on a honeycomb to obtain sample C-17 having 0.090 g of the catalyst per $cm^3$ of the honeycomb.

EXAMPLE C-18

A perovskite-containing compound ($LaSr_{2.0}Cu_{2.99}Rh_{0.01}O_7$) was obtained in the same manner as in Example C-17, except for replacing chloroplatinic acid hexahydrate with 0.826 g of rhodium nitrate dihydrate. The resulting perovskite-containing compound had a specific surface area of 21.8 $m^2/g$.

Thirty grams of the perovskite-containing compound were mixed with 100 g of γ-alumina ("A-11"), and 100 g of water was added thereto. The mixture was ground in a planetary mill for 30 minutes, and the viscosity was adjusted with water to prepare a wash coating slurry. The slurry was coated on a honeycomb to obtain sample C-18 having 0.094 g of the catalyst per $cm^3$ of the honeycomb.

EXAMPLE C-19

A perovskite-containing compound ($LaSr_{2.0}Cu_{2.99}Pd_{0.01}O_7$) was obtained in the same manner as in Example C-17, except for replacing chloroplatinic acid hexahydrate with 0.45 g of palladium chloride. The resulting perovskite-containing compound had a specific surface area of 24.0 $m^2/g$.

Thirty grams of the perovskite-containing compound were mixed with 100 g of γ-alumina ("A-11"), and 100 g of water was added thereto. The mixture was ground in a planetary mill for 30 minutes, and the viscosity was adjusted with water to prepare a wash coating slurry. The slurry was coated on a honeycomb to obtain sample C-19 having 0.097 g of the catalyst per $cm^3$ of the honeycomb.

EXAMPLE C-20

A perovskite-containing compound ($LaSr_{2.0}Cu_{2.99}Ru_{0.01}O_7$) was obtained in the same manner as in Example C-17, except for replacing chloroplatinic acid hexahydrate with 0.84 g of ruthenium chloride pentahydrate. The resulting perovskite-containing compound had a specific surface area of 19.6 $m^2/g$.

Thirty grams of the perovskite-containing compound were mixed with 100 g of γ-alumina ("A-11"), and 100 g of water was added thereto. The mixture was ground in a planetary mill for 30 minutes, and the viscosity was adjusted with water to prepare a wash coating slurry.

The slurry was coated on a honeycomb to obtain sample C-20 having 0.095 g of the catalyst per cm$^3$ of the honeycomb.

EXAMPLE C-21

Sample C-21 was obtained in the same manner as in Example C-2, except for using 1 g of the perovskite-containing compound (YBa$_2$Cu$_3$O$_7$) and 100 g of the H type mordenite ("HM-23"). Sample C-21 had 0.079 g of the sample per cm$^3$ of the honeycomb.

EXAMPLE C-22

Sample C-22 was obtained in the same manner as in Example C-2, except for using 10 g of the perovskite-containing compound (YBa$_2$Cu$_3$O$_7$) and 100 g of the H type mordenite ("HM-23"). Sample C-22 had 0.083 g of the sample per cm$^3$ of the honeycomb.

EXAMPLE C-23

Sample C-23 was obtained in the same manner as in Example C-2, except for using 50 g of the perovskite-containing compound (YBa$_2$Cu$_3$O$_7$) and 100 g of the H type mordenite ("HM-23"). Sample C-23 had 0.107 g of the sample per cm$^3$ of the honeycomb.

EXAMPLE C-24

Sample C-24 was obtained in the same manner as in Example C-2, except for using 50 g of the perovskite-containing compound (YBa$_2$Cu$_3$O$_7$) and 50 g of the H type mordenite ("HM-23"). Sample C-24 had 0.125 g of the sample per cm$^3$ of the honeycomb.

EXAMPLE C-25

Sample C-25 was obtained in the same manner as in Example C-2, except for replacing the H type mordenite with Ti-ZSM-5 prepared in the same manner as in Example A-25. The sample had 0.099 g of the catalyst per cm$^3$ of the honeycomb.

EXAMPLE C-26

A perovskite-containing compound (LaPb$_2$Co$_3$O$_7$) was obtained in the same manner as in Example C-1, except for using 89.50 g of lanthanum nitrate hexahydrate, 136.93 g of lead nitrate, and 154.45 g of cobalt nitrate hexahydrate. The resulting perovskite-containing compound had a specific surface area of 12.6 m$^2$/g.

Sixty grams of the resulting perovskite-containing compound were mixed with 100 g of H type mordenite ("HM-23"), and 100 g of water was added thereto to prepare a slurry. The slurry was coated on a honeycomb to obtain Sample C-26 having 0.137 g of the catalyst per cm$^3$ of the honeycomb.

EXAMPLE C-27

A perovskite-containing compound (NdBa$_2$Cu$_{2.7}$Ni$_{0.3}$O$_7$) was obtained in the same manner as in Example C-1, except for using 124.82 g of neodymium nitrate hexahydrate, 148.83 g of barium nitrate 371.48 g of cupric nitrate trihydrate, and 49.68 g of nickel nitrate hexahydrate. The resulting perovskite-containing compound had a specific surface area of 10.3 m$^2$/g.

Sixty grams of the resulting perovskite-containing compound were mixed with 100 g of H type mordenite ("HM-23"), and 100 g of water was added thereto to prepare a slurry. The slurry was coated on a honeycomb to obtain sample C-27 having 0.141 g of the catalyst per cm$^3$ of the honeycomb.

EXAMPLE C-28

A perovskite-containing compound (PrSr$_2$Cu$_{1.5}$Mn$_{1.5}$O$_7$) was obtained in the same manner as in Example C-1, except for using 273.2 g of praseodymium chloride heptahydrate, 309.71 g of strontium nitrate, 265.17 g of cupric nitrate trihydrate, and 269.00 g of manganese acetate tetrahydrate. The resulting perovskite-containing compound had a specific surface area of 9.8 m$^2$/g.

Sixty grams of the resulting perovskite-containing compound were mixed with 100 g of H type mordenite ("HM-23"), and 100 g of water was added thereto to prepare a slurry. The slurry was coated on a honeycomb to obtain sample C-28 having 0.133 g of the catalyst per cm$^3$ of the honeycomb.

EXAMPLE C-29

A perovskite-containing compound (La$_{0.8}$Gd$_{0.2}$Co$_{2.4}$Fe$_{0.6}$O$_7$) was obtained in the same manner as in Example C-1, except for using 202.05 g of lanthanum nitrate heptahydrate, 52.66 g of gadolinium nitrate hexahydrate, 228.65 g of barium nitrate, 61.72 g of strontium nitrate, 126.83 g of cupric nitrate trihydrate, 407.40 g of cobalt nitrate hexahydrate, and 100.77 g of ferric nitrate hexahydrate. The resulting perovskite-containing compound had a specific surface area of 8.8 m$^2$/g.

Sixty grams of the resulting perovskite-containing compound were mixed with 100 g of H type mordenite ("HM-23"), and 100 g of water was added thereto to prepare a slurry. The slurry was coated on a honeycomb to obtain sample C-29 having 0.129 g of the catalyst per cm$^3$ of the honeycomb.

EXAMPLE C-30

A perovskite-containing compound (La$_{0.8}$Pr$_{0.2}$Sr$_{2.0}$Cu$_{3.0}$O$_7$) was obtained in the same manner as in Example C-1, except for using 202.05 g of lanthanum nitrate heptahydrate, 43.56 g of praseodymium chloride, 246.88 g of strontium nitrate, and 422.76 g of cupric nitrate trihydrate. The resulting perovskite-containing compound had a specific surface area of 9.2 m$^2$/g.

Sixty grams of the resulting perovskite-containing compound were mixed with 100 g of H type mordenite ("HM-23"), and 100 g of water was added thereto to prepare a slurry. The slurry was coated on a honeycomb to obtain sample C-30 having 0.135 g of the catalyst per cm$^3$ of the honeycomb.

EXAMPLE C-31

A perovskite-containing compound (La$_{0.8}$Sm$_{0.2}$Sr$_2$Cu$_3$O$_7$) was prepared in the same manner as in Example C-1, except for using 202.05 g of lanthanum nitrate hexahydrate, 26.94 g of samarium nitrate, 246.88 g of strontium nitrate, and 422.76 g of cupric nitrate trihydrate. The resulting perovskite-containing compound had a specific surface area of 12.0 m$^2$/g.

To a mixture of 60 g of the perovskite-containing compound and 100 g of ALPO-5 prepared in the same manner as in Example A-11 was added 100 g of water to prepare a slurry. The slurry was coated on a honeycomb to obtain sample C-31 having 0.134 g of the catalyst per cm$^3$ of the honeycomb.

EXAMPLE C-32

In 500 ml of water were dissolved 202.05 g of lanthanum nitrate hexahydrate, 304.86 g of barium nitrate, 422.76 g of cupric nitrate trihydrate, and 56.59 g of bismuth hydroxide. To the resulting aqueous solution was added dropwise a 121 g/l sodium hydroxide aqueous solution to adjust to a pH of 10 while thoroughly stirring. After the neutralization reaction, the stirring was further continued for an additional period of 18 hours for maturing. The precipitate was repeatedly filtered, washed with water, and repulped until the filtrate had substantially the same conductivity as repulping water. The resulting filter cake was dried at 120° C. for 18 hours.

The dried product was ground, and 14.86 ml of a vanadyl oxalate aqueous solution (V content: 100 g/l) was added thereto, followed by thoroughly kneading. The blend was evaporated to dryness, dried at 120° C. for 18 hours, and calcined at 850° C. for 3 hours to obtain a perovskite-containing compound ($La_{0.8}Bi_{0.2}Ba_2Cu_3O_7$). The resulting perovskite-containing compound had a specific surface area of 11.6 $m^2/g$.

Sixty grams of the perovskite-containing compound were mixed with 100 g of silica-zirconia which was prepared in the same manner as in Example A-14, and 100 g of water was added thereto. The mixture was ground in a planetary mill for 30 minutes, and the viscosity was adjusted with water to prepare a wash coating slurry. The slurry was coated on a honeycomb to obtain sample C-32 having 0.119 g of the catalyst per $cm^3$ of the honeycomb.

COMPARATIVE EXAMPLE C-1

Sample Y-1 was prepared in the same manner as in Example C-4, except for using no H type mordenite. Sample Y-1 had 0.133 g of the catalyst per $cm^3$ of the honeycomb.

COMPARATIVE EXAMPLE C-2

Na type mordenite ($SiO_2/Al_2O_3$ molar ratio: 34) was treated in the same manner as in Example C-2 to obtain sample Y-2. Sample Y-2 contained 0.128 g of the catalyst per $cm^3$ of the honeycomb.

Samples C-1 to C-32 and Comparative Samples Y-1 and Y-2 were evaluated in the same manner as in Examples A-1 to A-46. The results obtained are shown in Table 3 below.

TABLE 3

| Catalyst | Reducing Agent | Nitrogen Conversion (%) | | | |
|---|---|---|---|---|---|
| | | 300° C. | 400° C. | 500° C. | 600° C. |
| C-1 | propane | 52.4 | 77.8 | 64.4 | 45.8 |
| | propylene | 80.4 | 81.2 | 67.7 | 32.1 |
| | 1,3-butadiene | 90.1 | 84.9 | 59.6 | 45.0 |
| | ethanol | 91.1 | 78.0 | 45.8 | 13.3 |
| C-2 | propylene | 92.8 | 91.0 | 85.6 | 37.0 |
| C-3 | propylene | 78.7 | 78.3 | 57.8 | 26.7 |
| C-4 | propane | 64.0 | 88.5 | 75.7 | 54.4 |
| | isobutane | 70.3 | 81.3 | 60.7 | 43.9 |
| | propylene | 91.2 | 87.2 | 64.6 | 46.8 |
| | trans-2-butene | 91.5 | 86.0 | 41.8 | 29.8 |
| C-5 | propane | 54.3 | 83.6 | 72.8 | 57.9 |
| C-6 | propylene | 87.7 | 90.4 | 62.5 | 31.5 |
| C-7 | propylene | 91.9 | 91.5 | 70.1 | 27.7 |
| | 2-butanol | 93.9 | 78.0 | 36.1 | 18.5 |
| C-8 | propylene | 91.2 | 81.2 | 60.0 | 37.9 |
| C-9 | propane | 44.7 | 76.4 | 62.0 | 43.1 |
| C-10 | propane | 51.6 | 74.0 | 69.0 | 45.2 |
| C-11 | cyclobutane | 74.7 | 86.7 | 67.3 | 36.5 |
| | ethylene glycol | 93.6 | 84.0 | 46.9 | 12.0 |
| C-12 | propylene | 81.7 | 92.9 | 67.9 | 36.2 |
| C-13 | propylene | 90.4 | 81.1 | 64.5 | 31.0 |
| C-14 | propane | 57.5 | 67.6 | 60.2 | 45.9 |
| C-14 | propylene | 81.5 | 85.3 | 77.8 | 48.0 |
| | 1-propanol | 91.2 | 89.7 | 41.5 | 14.3 |
| C-15 | propane | 41.3 | 63.8 | 67.6 | 51.8 |
| C-16 | propane | 32.0 | 54.6 | 69.0 | 55.9 |
| C-17 | propane | 93.7 | 86.6 | 56.5 | 44.1 |

TABLE 3-continued

| Catalyst | Reducing Agent | Nitrogen Conversion (%) | | | |
|---|---|---|---|---|---|
| | | 300° C. | 400° C. | 500° C. | 600° C. |
| C-18 | propane | 91.7 | 88.0 | 59.7 | 45.0 |
| C-19 | propane | 92.3 | 85.7 | 41.2 | 35.7 |
| C-20 | propane | 87.1 | 83.4 | 54.0 | 43.5 |
| C-21 | propylene | 72.5 | 72.7 | 51.3 | 39.7 |
| C-22 | propylene | 92.2 | 90.6 | 82.3 | 37.7 |
| C-23 | propylene | 85.1 | 89.6 | 62.4 | 23.9 |
| C-24 | propylene | 85.8 | 76.2 | 58.0 | 16.6 |
| C-25 | propylene | 92.0 | 90.6 | 83.5 | 39.8 |
| Y-1 | propane | 0.0 | 0.0 | 0.0 | 0.0 |
| Y-2 | propane | 9.9 | 15.3 | 26.1 | 12.2 |
| C-26 | propylene | 90.1 | 85.5 | 60.2 | 46.4 |
| C-27 | propylene | 94.1 | 93.3 | 87.8 | 41.3 |
| C-28 | propylene | 91.9 | 86.3 | 55.0 | 32.1 |
| C-29 | propylene | 88.5 | 83.0 | 52.7 | 30.2 |
| C-30 | propylene | 91.0 | 87.4 | 82.7 | 39.6 |
| C-31 | propylene | 87.9 | 84.1 | 74.1 | 31.7 |
| C-32 | propylene | 92.4 | 89.5 | 77.6 | 33.4 |

As is apparent from Table 3, each of the catalysts according to the present invention (samples C-1 to 32) achieves a high conversion of nitrogen oxide to nitrogen, whereas the comparative catalysts (sample Y-1 and 2) exhibit no or little catalysis.

EXAMPLE D-1

In 1000 ml of distilled water was dissolved 11.47 g of gallium nitrate octahydrate ($Ga(NO_3)_2 \cdot 8H_2O$), and 100 g of H type mordenite ("HM-23") was added thereto while stirring to conduct ion exchange for 4 hours. The reaction mixture was repeatedly filtered, washed with water, and repulped until the filtrate had the same conductivity as repulping water. The resulting filter cake was dried at 120° C. for 18 hours to obtain Ga-exchanged mordenite.

Separately, 101.05 g of lanthanum nitrate hexahydrate, 28.60 g of manganese acetate tetrahydrate, 74.08 g of strontium nitrate, and 135.83 g of cobalt nitrate hexahydrate were dissolved in 500 ml of water. To the resulting aqueous solution was added a 121 g/l sodium hydroxide aqueous solution to adjust to a pH of 10 while thoroughly stirring. After a precipitate was formed, the stirring was further continued for an additional period of 18 hours for maturing. The precipitate was repeatedly filtered, washed with water, and repulped until the filtrate had substantially the same conductivity as repulping water. The resulting filter cake was dried at 120° C. for 18 hours and then calcined at 700° C. for 3 hours.

The X-ray diffractometry of the resulting calcined product revealed formation of a perovskite crystal phase. The calcined product had a specific surface area of 23.7 $m^2/g$ ($La_{0.4}Sr_{0.6}Co_{0.8}Mn_{0.2}O_3$).

Forty grams of the perovskite compound were mixed with 60 g of the above prepared Ga-exchanged mordenite, and 100 g of water was added thereto. The mixture was ground in a planetary mill for 30 minutes, and the viscosity was adjusted with water to prepare a wash coating slurry. The slurry was coated on a honeycomb to obtain sample D-1 having 0.103 g of the catalyst per $cm^3$ of the honeycomb.

EXAMPLE D-2

In 1000 ml of distilled water was dissolved 3.15 g of silver nitrate, and 100 g of H type mordenite ("HM-23") was poured thereinto while stirring to conduct ion exchange for 4 hours. During the reaction, the pH of the system was maintained at 6.5 by addition of a 100 g/l monoethylamine aqueous solution. The reaction mixture was repeatedly filtered, washed with water, and repulped until the filtrate had the same conductivity as repulping water. The resulting filter cake was dried at 120° C. for 18 hours to obtain Ag-exchanged mordenite.

A perovskite compound ($LaMnO_3$) was obtained in the same manner as in Example D-1, except for using 89.5 g of lanthanum nitrate hexahydrate and 50.66 g of manganese acetate tetrahydrate. The resulting perovskite compound had a specific surface area of 29.1 $m^2/g$.

Sample D-2 was prepared in the same manner as in Example D-1, except for using 60 g of the above prepared Ag-exchanged mordenite and 40 g of the perovskite compound. Sample D-2 had 0.117 g of the catalyst per $cm^3$ of the honeycomb.

EXAMPLE D-3

In 1000 ml of distilled water was dissolved 19.8 g of nickel nitrate hexahydrate, and 100 g of zeolite US-Y ("330 HUA" produced by Toso Co., Ltd.) was added to the aqueous solution while stirring to conduct ion exchange for 4 hours. The reaction mixture was worked up in the same manner as in Example D-1 to obtain Ni-exchanged zeolite US-Y.

A perovskite compound ($La_{0.8}Pb_{0.2}MnO_3$) was prepared in the same manner as in Example D-1, except for using 71.60 g of lanthanum nitrate hexahydrate, 13.69 g of lead nitrate, and 50.66 g of manganese acetate tetrahydrate, and conducting the calcination at 800° C. for 3 hours. The resulting perovskite compound had a specific surface area of 23.7 $m^2/g$.

Sample D-3 was prepared in the same manner as in Example D-1, except for using 60 g of the above prepared Ni-exchanged zeolite US-Y and 40 g of the perovskite compound. Sample D-3 had 0.128 g of the catalyst per $cm^3$ of the honeycomb.

EXAMPLE D-4

In 1000 ml of distilled water was dissolved 6.28 g of cupric acetate monohydrate ($Cu(Ac)_2 \cdot H_2O$), and 100 g of zeolite US-Y ("330 HUA") was added thereto while stirring to conduct ion exchange for 4 hours. The reaction mixture was worked up in the same manner as in Example D-1 to obtain Cu-exchanged zeolite US-Y.

A perovskite compound ($LaCoO_3$) was prepared in the same manner as in Example D-1, except for using 88.07 g of lanthanum nitrate hexahydrate and 59.19 g of cobalt nitrate hexahydrate, and conducting calcination at 800° C. for 3 hours. The resulting perovskite compound had a specific surface area of 17.4 $m^2/g$.

Sample D-4 was prepared in the same manner as in Example D-1, except for using 60 g of the above prepared Cu-exchanged zeolite US-Y and 40 g of the perovskite compound. Sample D-4 had 0.122 g of the catalyst per $cm^3$ of the honeycomb.

EXAMPLE D-5

In 1000 ml of distilled water was dissolved 22.31 g of manganese acetate tetrahydrate, and 60 g of titania (specific surface area: 95 $m^2/g$) was added thereto with stirring to conduct ion exchange for 4 hours while maintaining the pH of the system at 5.0 with a 100 g/l aqueous solution of monoethylamine. The reaction mixture was worked up in the same manner as in Example D-1 to obtain Mn-exchanged titania.

A perovskite compound ($Ce_{0.8}Ba_{0.2}CoO_3$) was obtained in the same manner as in Example D-1, except for using 70.65 g of cerium nitrate hexahydrate, 10.63 g of barium nitrate, and 59.19 g of cobalt nitrate hexahydrate. The resulting perovskite compound had a specific surface area of 23.0 $m^2/g$. Sample D-5 was prepared in the same manner as in Example D-1, except for using 60 g of the above prepared Mn-exchanged titania and 40 g of the perovskite compound. Sample D-5 had 0.097 g of the catalyst per $cm^3$ of the honeycomb.

EXAMPLE D-6

In 1000 ml of distilled water was dissolved 21.13 g of cobalt acetate tetrahydrate, and 100 g of silica-alumina (product of Nikki Kagaku Co., Ltd.; specific surface area: 250 $m^2/g$) was added thereto with stirring to conduct ion exchange for 4 hours while maintaining the pH of the system at 4.5 with a 100 g/l aqueous solution of monoethylamine. The reaction mixture was worked up in the same manner as in Example D-1 to obtain Co-exchanged silica-alumina.

A perovskite-containing compound ($LaMn_{0.5}Ti_{0.5}O_3$) was prepared in the same manner as in Example D-1, except for using 90.84 g of lanthanum nitrate hexahydrate, 25.71 g of manganese acetate tetrahydrate, and 339.0 ml of a titanium tetrachloride aqueous solution (Ti content: 14.82 g/100 ml). The resulting perovskite compound had a specific surface area of 25.3 $m^2/g$.

Sample D-6 was obtained in the same manner as in Example D-1, except for using 60 g of the above prepared Co-exchanged silica-alumina and 40 g of the perovskite compound. Sample D-6 had 0.092 g of the catalyst per $cm^3$ of the honeycomb.

EXAMPLE D-7

SAPO-34 prepared in the same manner as in Example A-7 was poured into an aqueous solution of 6.71 g of zinc acetate ($Zn(Ac)_2$) in 1 l of distilled water to conduct ion exchange for 4 hours to obtain Zn-substituted SAPO-34.

To a mixture of 100.0 ml of an ethanol solution of lanthanum ethoxide ($La_{O3}$ content: 73 g/l), 21.74 ml of an ethanol solution of barium ethoxide (BaO content: 79 g/l), 49.95 ml of an ethanol solution of nickel ethoxide (NiO content: 67 g/l), and 9.22 ml of an ethanol solution of cobalt ethoxide (CoO content: 91 g/l), a 1% aqueous ammonia was slowly added dropwise while thoroughly stirring to conduct hydrolysis. The reaction mixture was evaporated to dryness while uniformly mixing, and the residue was calcined at 600° C. for 3 hours to obtain a perovskite compound ($La_{0.8}Ba_{0.2}Co0.8Ni_{0.2}O_3$). The perovskite compound had a specific surface area of 36.9 $m^2/g$.

Sample D-7 was prepared in the same manner as in Example D-1, except for using 40 g of the perovskite compound and 60 g of Zn-exchanged SAPO-34. Sample D-7 had 0.0103 g of the catalyst per $cm^3$ of the honeycomb.

EXAMPLE D-8

In 1000 ml of distilled water was dissolved 0.33 g of chloroplatinic acid hexahydrate, and 100 g of γ-alumina ("A-11") was added thereto. The resulting aqueous slurry was evaporated to dryness, and the residue was calcined at 600° C. for 3 hours to prepare Pt-on-γ-alumina.

A perovskite compound ($La_{0.4}Sr_{0.6}Co_{0.8}Fe_{0.2}O_3$) was prepared in the same manner as in Example D-1, except for using 101.05 g of lanthanum nitrate hexahydrate, 74.08 g of strontium nitrate, 135.83 g of cobalt nitrate hexahydrate, and 33.60 g of ferric nitrate hexahydrate.

The resulting perovskite compound had a specific surface area of 21.6 m$^2$/g.

Sample D-8 was prepared in the same manner as in Example D-1, except for using 60 g of the above prepared Pt-on-γ-alumina and 40 g of the perovskite compound. Sample D-8 had 0.091 g of the catalyst per cm$^3$ of the honeycomb.

EXAMPLE D-9

In 1000 ml of distilled water was dissolved 1.30 g of lanthanum acetate sesquihydrate (La(Ac)$_2$·1.5H$_2$O), and 100 g of H type mordenite ("HM-23") was added thereto to conduct ion exchange for 4 hours. The resulting reaction mixture was worked up in the same manner as in Example D-1 to obtain La-exchanged H type mordenite.

A perovskite compound (La$_{0.8}$Zn$_{0.2}$Co$_{0.8}$Cu$_{0.2}$O$_3$) was obtained in the same manner as in Example D-1, except for using 202.10 g of lanthanum nitrate hexahydrate, 28.41 g of zinc nitrate hexahydrate, 135.83 g of cobalt nitrate hexahydrate, and 28.19 g of cupric nitrate trihydrate. The resulting perovskite compound had a specific surface area of 17.3 m$^2$/g.

Sample D-9 was prepared in the same manner as in Example D-1, except for using 60 g of the above prepared La-exchanged H type mordenite and 40 g of the perovskite compound. Sample D-9 had 0.115 g of the catalyst per cm$^3$ of the honeycomb.

EXAMPLE D-10

In 1000 ml of distilled water was dissolved 15.6 g of germanium tetrachloride (GeCl$_4$). Separately, zirconium hydroxide was calcined at 600° C. for 3 hours to prepare zirconia having a specific surface area of 49.1 m$^2$/g. The resulting zirconia was added to the above prepared aqueous solution, and the slurry was fed to a spray drier ("GB22") with stirring. After spray drying, the residue was calcined at 600° C. for 3 hours to prepare Ge-on-zirconia.

A perovskite compound (La$_{0.8}$Ag$_{0.2}$Co$_{0.8}$Zr$_{0.2}$O$_3$) was prepared in the same manner as in Example D-1, except for using 202.10 g of lanthanum nitrate hexahydrate, 19.82 g of silver nitrate, 135.83 g of cobalt nitrate hexahydrate, and 69.87 g of zirconium nitrate pentahydrate. The resulting perovskite compound had a specific surface area of 17.3 m$^2$/g.

Sample D-10 was prepared in the same manner as in Example D-1, except for using 60 g of the above prepared Ge-on-zirconia and 40 g of the perovskite compound. Sample D-10 had 0.132 g of the catalyst per cm$^3$ of the honeycomb.

EXAMPLE D-11

Twenty-one milliliters of a cerium nitrate aqueous solution (CeO$_2$ content: 20%) was diluted with distilled water to 1000 ml, and 100 g of H type mordenite ("HM-23") was poured thereinto. The system was maintained at a pH of 1.8 with monoethylamine to conduct ion exchange form 4 hours. The resulting reaction mixture was worked up in the same manner as in Example D-1 to obtain Ce-exchanged H type mordenite.

A perovskite compound (La$_{0.4}$Sr$_{0.6}$Co$_{0.8}$Cr$_{0.2}$O$_3$) was prepared in the same manner as in Example D-1, except for using 101.05 g of lanthanum nitrate hexahydrate, 74.08 g of strontium nitrate, 135.83 g of cobalt nitrate hexahydrate, and 27.79 g of chromium nitrate. The resulting perovskite compound had a specific surface area of 20.3 m$^2$/g. Sample D-11 was prepared in the same manner as in Example D-1, except for using 60 g of the above prepared Ce-exchanged H type mordenite and 40 g of the perovskite compound. Sample D-11 had 0.118 g of the catalyst per cm$^3$ of the honeycomb.

EXAMPLE D-12

ALPO-5 prepared in the same manner as in Example A-11 was poured into an aqueous solution of 9.12 g of ferric nitrate nonahydrate (Fe(NO$_3$)$_3$·9H$_2$O) in 1 l of distilled water while stirring to obtain Fe-exchanged ALPO-5.

A perovskite compound (La$_{0.4}$Sr$_{0.6}$Co$_{0.8}$Nb$_{0.2}$O$_3$O) was obtained in the same manner as in Example D-1, except for using 101.05 g of lanthanum nitrate hexahydrate, 74.08 g of strontium nitrate, 135.83 g of cobalt nitrate hexahydrate, and 216.8 ml of a solution of niobium pentachloride in a hydrochloric aqueous solution (Nb content: 50 g/l). The resulting perovskite compound had a specific surface area of 18.9 ml/g.

Sample D-12 was prepared in the same manner as in Example D-1, except for using 40 g of the perovskite compound and 60 g of Fe-exchanged ALPO-5. Sample D-12 had 0.109 g of the catalyst per cm$^3$ of the honeycomb.

EXAMPLE D-13

In 1000 ml of distilled water was dissolved 50 ml of a solution of niobium pentachloride in a hydrochloric aqueous solution (Nb content: 50 g/l), and 100 g of H type mordenite ("HM-23") was poured thereinto with stirring to conduct ion exchange for 4 hours. The reaction mixture was worked up in the same manner as in Example D-1 to obtain Nb-exchanged H type mordenite.

In 500 ml of water were dissolved 88.07 g of lanthanum nitrate hexahydrate, 10.76 g of strontium nitrate, and 50.66 g of cobalt acetate tetrahydrate, and a 121 g/l sodium hydroxide aqueous solution was added dropwise thereto while thoroughly stirring to adjust the pH to 10. After a precipitate was formed, the stirring was further continued for 18 hours for maturing. The precipitate was repeatedly filtered, washed with water, and repulped until the filtrate had substantially the same conductivity as repulping water. The resulting filter cake was dried at 120° C. for 18 hours, followed by grinding. To the grinds was added 25.90 ml of a vanadyl oxalate aqueous solution (V content: 100 g/l), and the mixture was thoroughly kneaded and then evaporated to dryness. The residue was dried at 120° C. for 18 hours and calcined at 850° C. for 3 hours to obtain a perovskite compound (La$_{0.8}$Sr$_{0.2}$Co$_{0.8}$V$_{0.2}$O$_3$). The resulting perovskite compound had a specific surface area of 12.8 m$^2$/g.

Sample D-13 was prepared in the same manner as in Example D-1, except for using 40 g of the perovskite compound and 60 g of Nb-exchanged H type mordenite. Sample D-13 had 0.124 g of the catalyst per cm$^3$ of the honeycomb.

EXAMPLE D-14

A hundred grams of Na mordenite ("NM-100P" produced by Nihon Kagaku Co., Ltd.) were poured into a mixture of 500 ml of a zirconyl nitrate dihydrate (ZrO(NO$_3$)$_2$·2H$_2$O) aqueous solution (ZrO$_2$ content: 100 g/l) and 500 ml of a titanyl sulfate (TiOSO$_4$) aqueous solution (TiO$_2$ content: 100 g/l), followed by stirring to conduction exchange for 4 hours. The reaction mixture was worked up in the same manner as in Example D-1 to obtain Ti-Zr-exchanged H type mordenite.

A perovskite compound ($La_{0.8}Sr_{0.2}Co_{0.8}Mo_{0.2}O_3$) was prepared in the same manner as in Example D-13, except for replacing the vanadyl oxalate aqueous solution with 260.22 ml of a solution of ammonium molybdate in aqueous ammonia ($MoO_2$ content: 25 g/l). The resulting perovskite compound had a specific surface area of 10.4 $m^2/g$.

Sample D-14 was prepared in the same manner as in Example D-1, except for using 40 g of the perovskite compound and 60 g of the Ti-Zr-exchanged H type mordenite. Sample D-14 had 0.119 g of the catalyst per $cm^3$ of the honeycomb.

EXAMPLE D-15

In 300 ml of distilled water was dissolved 13.58 g of chromium nitrate nonahydrate ($Cr(NO_3)_3 \cdot 9H_2O$), and 100 g of γ-alumina ("A-11") was added thereto with stirring. The resulting aqueous slurry was dried in a spray drier ("GB-22"), and the residue was calcined at 600° C. [or 3 hours to prepare Cr-on-γ-alumina.

In 1000 ml of water were dissolved 173.20 g of lanthanum nitrate hexahydrate, 126.98 g of strontium nitrate, 276.48 g of cobalt nitrate hexahydrate, and 25.90 g of chloroplatinic acid hexahydrate. To the resulting aqueous solution was added dropwise a 121 g/l aqueous solution of sodium hydroxide with stirring to adjust to a pH of 10 to conduct hydrolysis. After the reaction, the stirring was further continued for 18 hours. The reaction mixture was worked up in the same manner as in Example D-1 to obtain a perovskite compound $La_{0.4}Sr_{0.6}Co_{0.95}Pt_{0.05}O_3$). The resulting perovskite compound had a specific surface area of 27.6 $m^2/g$.

Sample D-15 was obtained in the same manner as in Example D-1, except for using 60 g of the above prepared Cr-on-γ-alumina and 40 g of the perovskite compound. Sample D-15 had 0.096 g of the catalyst per $cm^3$ of the honeycomb.

EXAMPLE D-16

A perovskite compound ($La_{0.4}Sr_{0.6}Co_{0.95}Rh_{0.05}O_3$) was prepared in the same manner as in Example D-15, except for replacing chloroplatinic acid hexahydrate with 16.25 g of rhodium nitrate dihydrate. The resulting perovskite compound had a specific surface area of 29.6 $m^2/g$.

Sample D-16 was prepared in the same manner as in Example D-1, except for using 40 g of the perovskite compound and 60 g of the Cr-on-γ-alumina prepared in Example D-15. Sample D-16 had 0.095 g of the catalyst per $cm^3$ of the honeycomb.

EXAMPLE D-17

In 1 l of distilled water was dissolved 9.45 g of stannic chloride ($SnCl_4$), and 100 g of H type mordenite ("HM-23") was poured thereinto with stirring to conduct ion exchange for 4 hours. The reaction mixture was worked up in the same manner as in Example D-1 to obtain Sn-exchanged H type mordenite.

A perovskite compound ($La_{0.4}Sr_{0.6}Co_{0.95}Pd_{0.05}O_3$) was prepared in the same manner as in Example D-15, except for replacing chloroplatinic acid hexahydrate with 8.67 g of palladium chloride. The resulting perovskite compound had a specific surface area of 28.5 $m^2/g$.

Sample D-17 was prepared in the same manner as in Example D-1, except for using 40 g of the perovskite compound and 60 g of the Sn-exchanged H type mordenite. Sample D-17 had 0.113 g of the catalyst per $cm^3$ of the honeycomb.

EXAMPLE D-18

In 1000 ml of distilled water was dissolved 11.68 g of yttrium nitrate tetrahydrate, and 100 g of H type mordenite ("HM-23") was poured thereinto, followed by stirring for 4 hours to conduct ion exchange. The reaction mixture was worked up in the same manner as in example D-1 to obtain Y-exchanged H type mordenite.

A perovskite compound ($La_{0.4}Sr_{0.6}Co_{0.95}Ru_{0.05}O_3$) was prepared in the same manner as in Example D-15, except for replacing chloroplatinic acid hexahydrate with 16.15 g of ruthenium tetrachloride pentahydrate ($RuCl_4 \cdot 5H_2O$). The resulting perovskite compound had a specific surface area of 25.3 $m^2/g$.

Sample D-18 was prepared in the same manner as in Example D-1, except for using 40 g of the perovskite compound and 60 g of Y-exchanged H type mordenite. Sample D-18 had 0.125 g of the catalyst per $cm^3$ of the honeycomb.

EXAMPLE D-19

Sample D-19 was prepared in the same manner as in Example D-1, except for using 100 g of the Ga-exchanged H type mordenite and 1 g of the perovskite compound ($La_{0.4}Sr_{0.6}Co_{0.8}Mn_{0.2}O_3$). Sample D-19 had 0.099 g of the catalyst per $cm^3$ of the honeycomb.

EXAMPLE D-20

Sample D-20 was prepared in the same manner as in Example D-1, except for using 100 g of the Ga-exchanged H type mordenite and 20 g of the perovskite compound ($La_{0.4}Sr_{0.6}Co_{0.8}Mn_{0.2}O_3$). Sample D-20 had 0.108 g of the catalyst per $cm^3$ of the honeycomb.

EXAMPLE D-21

Sample D-21 was prepared in the same manner as in Example D-1, except for using 100 g of the Ga-exchanged H type mordenite and 50 g of the perovskite compound ($La_{0.4}Sr_{0.6}Co_{0.8}Mn_{0.2}O_3$). Sample D-21 had 0.113 g of the catalyst per $cm^3$ of the honeycomb.

EXAMPLE D-22

Sample D-22 was prepared in the same manner as in Example D-1, except for using 30 g of the Ga-exchanged H type mordenite and 70 g of the perovskite compound ($La_{0.4}Sr_{0.6}Co_{0.8}Mn_{0.2}O_3$). Sample D-22 had 0.115 g of the catalyst per $cm^3$ of the honeycomb.

EXAMPLE D-23

A hundred grams of Na type mordenite ("ZSM-5", $SiO_2/Al_2O_3$ molar ratio: 35) were immersed in 1 l of a 0.025 mol/l aqueous solution of yttrium nitrate tetrahydrate, followed by thoroughly stirring to conduct ion exchange. The reaction mixture was filtered and washed with water to obtain a zeolite cake. The filter cake was dried and calcined at 650° C. for 4 hours to obtain Y-exchanged zeolite.

Sample D-23 was prepared in the same manner as in Example D-3, except for replacing the Ni-exchanged US-Y with the above prepared Y-exchanged ZSM-5. Sample D-23 had 0.117 g of the catalyst per $cm^3$ of the honeycomb.

EXAMPLE D-24

A hundred grams of 0 type silica sol produced by Nissan Chemicals Industries, Ltd. ($SiO_2$ content: 20%)

and 97.20 g of zirconium chloride were mixed with stirring, and 48.1 ml of a bismuth nitrate pentahydrate aqueous solution (Bi(NO$_3$)$_3$ content: 100 g/l) was added thereto. Water was added to the mixture to make 500 ml. To the solution was added a 121 g/l sodium hydroxide aqueous solution to adjust to a pH of 10. After the neutralization reaction, the stirring was continued for 18 hours. The reaction product was repeatedly filtered, washed with water, and repulped. The filter cake was dried at 120° C. for 18 hours and then calcined at 700° C. for 3 hours to obtain Bi-on-SiO$_2$-ZrO$_2$ having a specific surface area of 297 m$^2$/g.

In 500 ml of water were dissolved 173.49 g of yttrium nitrate tetrahydrate and 45.52 g of cobalt nitrate hexahydrate to prepare an aqueous solution. A 121 g/l sodium hydroxide aqueous solution was added dropwise thereto while thoroughly stirring to adjust the pH to 10. After a precipitate was formed, the stirring was further continued for 18 hours for maturing. The precipitate was repeatedly filtered, washed with water, and repulped until the filtrate had substantially the same conductivity as repulping water. The resulting filter cake was dried at 120° C. for 18 hours, followed by calcining at 700° C. for 3 hours.

The X-ray diffractometry of the resulting calcined product revealed formation of a perovskite crystal phase. The calcined product had a specific surface area of 18.5 m$^2$/g.

Sample D-24 was prepared in the same manner as in Example D-1, except for using 60 g of the above prepared Bi-on-SiO$_2$-ZrO$_2$ and 40 g of the perovskite compound. Sample D-24 had 0.124 g of the catalyst per cm$^3$ of the honeycomb.

EXAMPLE D-25

In 1 l of distilled water was dissolved 8.20 g of lead nitrate, and 100 g of H type mordenite ("HM-23") was poured thereinto, followed by stirring for 4 hours to conduct ion exchange. The reaction mixture was worked up in the same manner as in Example D-1 to obtain Pb-exchanged H type mordenite.

A perovskite compound (LaCo$_{0.8}$Mn$_{0.2}$O$_3$) was prepared in the same manner as in Example D-19, except for using 89.5 g of lanthanum nitrate hexahydrate, 41.19 g of cobalt acetate tetrahydrate, and 10.13 g of manganese acetate tetrahydrate. The resulting perovskite compound had a specific surface area of 24.8 m$^2$/g.

Sample D-25 was prepared in the same manner as in Example D-1, except for using 40 g of the perovskite compound and 60 g of Pb-exchanged H type mordenite. Sample D-25 had 0.120 g of the catalyst per cm$^3$ of the honeycomb.

EXAMPLE D-26

A perovskite compound (La$_{0.4}$Y$_{0.4}$Sr$_{0.2}$Co$_{0.8}$Mn$_{0.2}$O$_3$) was prepared in the same manner as in Example D-25, except for using 35.80 g of lanthanum nitrate hexahydrate, 28.69 g of yttrium nitrate tetrahydrate, 8.75 g of strontium nitrate, 41.19 g of cobalt acetate tetrahydrate, and 10.13 g of manganese acetate tetrahydrate. The resulting perovskite compound had a specific surface area of 20.4 m$^2$/g.

Sample D-26 was prepared in the same manner as in Example D-1, except for using 40 g of the perovskite compound and 60 g of the same Ga-exchanged H type mordenite as used in Example D-1. Sample D-26 had 0.116 g of the catalyst per cm$^3$ of the honeycomb.

EXAMPLE D-27

A perovskite compound (La$_{0.2}$Y$_{0.4}$Ce$_{0.4}$CrO$_3$) was prepared in the same manner as in Example D-26, except for using 17.90 g of lanthanum nitrate hexahydrate, 28.69 g of yttrium nitrate tetrahydrate, 35.90 g of cerium nitrate hexahydrate, and 49.22 g of chromium nitrate and calcining the mixture at 800° C. for 3 hours. The resulting perovskite compound had a specific surface area of 21.6 m$^2$/g.

Sample D-27 was prepared in the same manner as in Example D-1, except for using 40 g of the perovskite compound and 60 g of the same Ga-exchanged H type mordenite as used in Example D-1. Sample D-27 had 0.128 g of the catalyst per cm$^3$ of the honeycomb.

EXAMPLE D-28

A perovskite compound (Ce$_{0.8}$Ba$_{0.2}$Cu$_{0.5}$Cr$_{0.5}$O$_3$) was prepared in the same manner as in Example D-26, except for using 70.65 g of cerium nitrate hexahydrate, 10.63 g of barium nitrate, 24.57 g of cupric nitrate trihydrate, and 24.22 g of chromium nitrate. The resulting perovskite compound had a specific surface area of 19.3 m$^2$/g.

Sample D-28 was prepared in the same manner as in Example D-1, except for using 40 g of the perovskite compound and 60 g of the same Ga-exchanged H type mordenite as used in Example D-1. Sample D-28 had 0.123 g of the catalyst per cm$^3$ of the honeycomb.

EXAMPLE D-29

A perovskite compound (La$_{0.8}$Ce$_{0.2}$Mn$_{0.5}$Ti$_{0.5}$O$_3$) was prepared in the same manner as in Example D-26, except for using 72.67 g of lanthanum nitrate hexahydrate, 18.22 g of cerium nitrate hexahydrate, 25.71 g of manganese acetate tetrahydrate, and 339.0 ml of a titanium tetrachloride aqueous solution (Ti content: 14.82 g/100 ml). The resulting perovskite compound had a specific surface area of 23.1 m$^2$/g.

Sample D-29 was prepared in the same manner as in Example D-1, except for using 40 g of the perovskite compound and 60 g of the same Ga-exchanged H type mordenite as used in Example D-1. Sample D-29 had 0.119 g of the catalyst per cm$^3$ of the honeycomb.

EXAMPLE D-30

A perovskite compound (La$_{0.4}$Y$_{0.4}$Sr$_{0.2}$Ni$_{0.8}$Fe$_{0.2}$O$_3$) was prepared in the same manner as in Example D-26, except for using 101.05 g of lanthanum nitrate hexahydrate, 80.97 g of yttrium nitrate tetrahydrate, 24.69 g of strontium nitrate, 135.72 g of nickel nitrate hexahydrate, and 33.60 g of ferric nitrate hexahydrate. The resulting perovskite compound had a specific surface area of 24.0 m$^2$/g.

Sample D-30 was prepared in the same manner as in Example D-1, except for using 40 g of the perovskite compound and 60 g of the same Ga-exchanged H type mordenite as used in Example D-1. Sample D-30 had 0.109 g of the catalyst per cm$^3$ of the honeycomb.

EXAMPLE D-31

A perovskite compound (La$_{0.6}$Y$_{0.2}$Ag$_{0.2}$Cu$_{0.8}$Zr$_{0.2}$O$_3$) was prepared in the same manner as in Example D-26, except for using 151.58 g of lanthanum nitrate hexahydrate, 40.59 g of yttrium nitrate tetrahydrate, 19.82 g of silver nitrate, 112.77 g of cupric nitrate trihydrate, and 69.87 g of zirconium nitrate pentahydrate. The resulting perovskite compound had a specific surface area of 17.8 m$^2$/g.

Sample D-31 was prepared in the same manner as in Example D-1, except for using 40 g of the perovskite compound and 60 g of the same Ga-exchanged H type mordenite as used in Example D-1. Sample D-31 had 0.115 g of the catalyst per cm$^3$ of the honeycomb.

EXAMPLE D-32

In 500 ml of water were dissolved 44.16 g of cerium nitrate hexahydrate, 35.29 g of yttrium nitrate tetrahydrate, 10.76 g of strontium nitrate, and 58.57 g of ferric nitrate nonahydrate. A 121 g/l sodium hydroxide aqueous solution was added dropwise thereto while thoroughly stirring to adjust the pH to 10. After a precipitate was formed, the stirring was further continued for 18 hours for maturing. The precipitate was repeatedly filtered, washed with water, and repulped until the filtrate had substantially the same conductivity as repulping water. The resulting filter cake was dried at 120° C. for 18 hours, followed by grinding. To the grinds was added 25.90 ml of a vanadyl oxalate aqueous solution (V content: 100 g/l), and the mixture was thoroughly kneaded and then evaporated to dryness. The residue was dried at 120° C. for 18 hours and calcined at 850° C. for 3 hours to obtain a perovskite compound ($Ce_{0.4}Y_{0.4}Sr_{0.2}Fe_{0.8}V_{0.2}O_3$). The resulting perovskite compound had a specific surface area of 13.7 m$^2$/g.

Sample D-32 was prepared in the same manner as in Example D-1, except for using 40 g of the perovskite compound and 60 g of the Ga-exchanged H type mordenite used in Example 1. Sample D-32 had 0.120 g of the catalyst per cm$^3$ of the honeycomb.

EXAMPLE D-33

In 1000 ml of water were dissolved 173.20 g of lanthanum nitrate hexahydrate, 126.98 g of strontium nitrate, 276.48 g of cupric nitrate trihydrate, and 25.90 g of chloroplatinic acid hexahydrate to prepare an aqueous solution. A 121 g/l sodium hydroxide aqueous solution was added dropwise thereto while thoroughly stirring to adjust the pH to 10. After the hydrolysis reaction, the stirring was further continued for 18 hours. The reaction mixture was worked up in the same manner as in Example D-26 to obtain a perovskite compound ($La_{0.4}Sr_{0.6}Cu_{0.95}Pt_{0.05}O_3$). The resulting perovskite compound had a specific surface area of 27.6 m$^2$/g. Sample D-33 was prepared in the same manner as in Example D-1, except for using 40 g of the perovskite compound and 60 g of the Ga-exchanged H type mordenite used in Example 1. Sample D-33 had 0.111 g of the catalyst per cm$^3$ of the honeycomb.

EXAMPLE D-34

In 250 ml of water were dissolved 72.67 g of lanthanum nitrate hexahydrate, 4.24 g of potassium nitrate, 50.39 g of manganese acetate tetrahydrate, and 1.36 g of rhodium nitrate dihydrate to prepare an aqueous solution. The aqueous solution was evaporated to dryness in a spray drier ("GB-22"), and the residue was calcined at 700° C. for 3 hours to obtain a perovskite compound ($La_{0.8}K_{0.2}Mn_{0.98}Rh_{0.02}O_3$). The resulting perovskite compound had a specific surface area of 18.3 m$^2$/g.

Sample D-34 was prepared in the same manner as in Example D-1, except for using 40 g of the perovskite compound and 60 g of the Ga-exchanged H type mordenite used in Example 1. Sample D-34 had 0.124 g of the catalyst per cm$^3$ of the honeycomb.

EXAMPLE D-35

In 500 ml of water were dissolved 72.67 g of lanthanum nitrate hexahydrate, 9.05 g of bismuth nitrate pentahydrate, 7.71 g of lithium nitrate, and 38.63 g of chloroplatinic acid hexahydrate. The resulting aqueous solution was worked up in the same manner as in Example D-34 to obtain a perovskite compound ($La_{0.9}Bi_{0.1}Li_{0.6}Pt_{0.4}O_3$). The resulting perovskite compound had a specific surface area of 20.7 m$^2$/g.

Sample D-35 was prepared in the same manner as in Example D-1, except for using 40 g of the perovskite compound and 60 g of the Ga-exchanged H type mordenite used in Example 1. Sample D-35 had 0.120 g of the catalyst per cm$^3$ of the honeycomb.

EXAMPLE D-36

To 250 ml of water were added 72.67 g of lanthanum nitrate hexahydrate, 32.44 g of cupric nitrate trihydrate, and 7.42 g of tantalum pentoxide ($Ta_2O_5$), followed by thoroughly stirring to prepare a slurry. The slurry was evaporated to dryness by means of a spray drier ("GB-22"), and the residue was calcined at 800° C. for 3 hours to obtain a perovskite compound ($LaCu_{0.8}Ta_{0.2}O_3$). The resulting perovskite compound had a specific surface area of 9.2 m$^2$/g.

Sample D-36 was prepared in the same manner as in Example D-1, except for using 40 g of the perovskite compound and 60 g of the Ga-exchanged H type mordenite used in Example 1. Sample D-36 had 0.118 g of the catalyst per cm$^3$ of the honeycomb.

EXAMPLE D-37

In 1000 ml of distilled water was dissolved 37.19 g of neodymium nitrate hexahydrate, and 100 g of H type mordenite ("HM-23") was added thereto while stirring to conduct ion exchange for 4 hours. The reaction mixture was worked up in the same manner as in Example D-1 to obtain Nd-exchanged H type mordenite.

Separately, 224.02 g of praseodymium chloride heptahydrate, 132.48 g of lead nitrate, and 245.09 g of manganese acetate tetrahydrate were dissolved in 500 ml of water. To the resulting aqueous solution was added dropwise a 121 g/l sodium hydroxide aqueous solution to adjust the pH to 10 while thoroughly stirring. After a precipitate was formed, the stirring was further continued for an additional period of 18 hours for maturing. The precipitate was repeatedly filtered, washed with water, and repulped until the filtrate had substantially the same conductivity as repulping water. The resulting filter cake was dried at 120° C. for 18 hours and then calcined at 700° C. for 3 hours.

The X-ray diffractometry of the resulting calcined product revealed formation of a perovskite crystal phase. The calcined product had a specific surface area of 25.9 m$^2$/g ($Pr_{0.8}Pb_{0.4}MnO_3$).

Forty grams of the perovskite compound were mixed with 60 g of the above prepared Nd-exchanged H type mordenite, and 100 g of water was added thereto. The mixture was ground in a planetary mill for 30 minutes, and the viscosity was adjusted with water to prepare a wash coating slurry. The slurry was coated on a honeycomb to obtain sample D-37 having 0.128 g of the catalyst per cm$^3$ of the honeycomb.

EXAMPLE D-38

A perovskite compound ($Nd_{0.6}Pb_{0.4}MnO_3$) was prepared in the same manner as in Example D-37, except for using 263.01 g of neodymium nitrate hexahydrate, 132.48 g of lead nitrate, and 245.09 g of manganese acetate tetrahydrate. The resulting perovskite compound had a specific surface area of 30.7 m$^2$/g.

Forty grams of the perovskite compound were mixed with 60 g of the Ga-exchanged mordenite used in Example D-1, and 100 g of water was added thereto to obtain a slurry. The slurry was coated on a honeycomb to obtain sample D-38 having 0.123 g of the catalyst per cm$^3$ of the honeycomb.

EXAMPLE D-39

A perovskite compound ($Gd_{0.6}Pb_{0.4}MnO_3$) was prepared in the same manner as in Example D-37, except for using 270.82 g of gadolinium nitrate hexahydrate, 132.48 g of lead nitrate, and 245.09 g of manganese acetate tetrahydrate and calcining the mixture at 700° C. for 3 hours. The resulting perovskite compound had a specific surface area of 24.2 m$^2$/g.

Forty grams of the perovskite compound were mixed with 60 g of the Ga-exchanged mordenite used in Example D-1, and 100 g of water was added thereto to obtain a slurry. The slurry was coated on a honeycomb to obtain sample D-39 having 0.120 g of the catalyst per cm$^3$ of the honeycomb.

EXAMPLE D-40

A perovskite compound ($SmCoO_3$) was prepared in the same manner as in Example D-37, except for using 230.97 g of samarium nitrate hexahydrate and 291.03 g of cobalt nitrate hexahydrate and calcining the mixture at 800° C. for 3 hours. The resulting perovskite compound had a specific surface area of 16.4 m$^2$/g.

Forty grams of the perovskite compound were mixed with 60 g of the Ga-exchanged mordenite used in Example D-1, and 100 g of water was added thereto to obtain a slurry. The slurry was coated on a honeycomb to obtain sample D-40 having 0.118 g of the catalyst per cm$^3$ of the honeycomb.

EXAMPLE D-41

A perovskite compound ($Eu_{0.8}Ba_{0.2}CoO_3$) was prepared in the same manner as in Example D-37, except for using 354.68 g of europium nitrate hexahydrate, 52.27 g of barium nitrate, and 291.03 g of cobalt nitrate hexahydrate. The resulting perovskite compound had a specific surface area of 18.5 m$^2$/g.

Thirty grams of the perovskite compound were mixed with 100 g of the Ga-exchanged mordenite used in Example D-1, and 100 g of water was added thereto to obtain a slurry. The slurry was coated on a honeycomb to obtain sample D-41 having 0.125 g of the catalyst per cm$^3$ of the honeycomb.

EXAMPLE D-42

In 200 ml of distilled water was dissolved 8.75 g of calcium nitrate octahydrate ($Ca(NO_3)_2 \cdot 4H_2O$), and 100 g of H type mordenite ("HM-23") was added thereto with stirring to conduct ion exchange for 4 hours while maintaining the pH of the system at 7.0 with diluted aqueous ammonia (one part of aqueous ammonia diluted with 3 parts of water, hereinafter referred to as (1+3) aqueous ammonia). The resulting reaction mixture was worked up in the same manner as in Example D-1 to obtain Ca-exchanged H type mordenite.

Sample D-42 was prepared in the same manner as in Example D-1, except for using 60 g of the thus prepared Ca-exchanged H type mordenite and 40 g of the perovskite compound ($La_{0.8}Pb_{0.2}MnO_3$) prepared in Example D-3. Sample D-42 had 0.119 g of the catalyst per cm$^3$ of the honeycomb.

EXAMPLE D-43

In 200 ml of distilled water was dissolved 6.83 g of magnesium nitrate dihydrate ($Mg(NO_3)_2 \cdot 2H_2O$), and 100 g of H type mordenite ("HM-23") was added thereto with stirring to conduct ion exchange for 4 hours while maintaining the pH of the system at 7.0 with (1+3) aqueous ammonia. The resulting reaction mixture was worked up in the same manner as in Example D-1 to obtain Mg-exchanged H type mordenite.

Sample D-43 was prepared in the same manner as in Example D-1, except for using 60 g of the thus prepared Mg-exchanged H type mordenite and 40 g of the perovskite compound ($La_{0.8}Pb_{0.2}MnO_3$) prepared in Example D-3. Sample D-43 had 0.108 g of the catalyst per cm$^3$ of the honeycomb.

EXAMPLE D-44

In 200 ml of distilled water was dissolved 10.51 g of strontium nitrate tetrahydrate, and 100 g of H type mordenite ("HM-23") was added thereto with stirring to conduct ion exchange for 4 hours while maintaining the pH of the system at 7.0 with (1+3) aqueous ammonia. The resulting reaction mixture was worked up in the same manner as in Example D-1 to obtain Sr-exchanged H type mordenite.

Sample D-44 was prepared in the same manner as in Example D-1, except for using 60 g of the thus prepared Sr-exchanged H type mordenite and 40 g of the perovskite compound ($La_{0.8}Pb_{0.2}MnO_3$) prepared in Example D-3. Sample D-44 had 0.134 g of the catalyst per cm$^3$ of the honeycomb.

EXAMPLE D-45

In 200 ml of distilled water was dissolved 9.68 g of barium nitrate, and 100 g of H type mordenite ("HM-23") was added thereto with stirring to conduct ion exchange for 4 hours while maintaining the pH of the system at 7.0 with (1+3) aqueous ammonia. The resulting reaction mixture was worked up in the same manner as in Example D-1 to obtain Ba-exchanged H type mordenite.

Sample D-45 was prepared in the same manner as in Example D-1, except for using 60 g of the thus prepared Ba-exchanged H type mordenite and 40 g of the perovskite compound ($La_{0.8}Pb_{0.2}MnO_3$) prepared in Example D-3. Sample D-45 had 0.137 g of the catalyst per cm$^3$ of the honeycomb.

COMPARATIVE EXAMPLE D-1

A wash coating slurry was prepared in the same manner as in Example D-1, except for using no activated titanium oxide. The slurry was coated on a honeycomb to prepare Sample Z-1 containing 0.132 g of the catalyst per cm$^3$ of the honeycomb.

COMPARATIVE EXAMPLE D-2

Na type mordenite ($SiO_2/Al_2O_3$ molar ratio: 34) was treated in the same manner as in Example D-2 to obtain sample Z-2. Sample Z-2 contained 0.128 g of the catalyst per cm$^3$ of the honeycomb.

Samples D-1 to D-45 and Comparative samples Z-1 and Z-2 were evaluated in the same manner as in Examples A-1 to A-46, except that the space velocity in gas chromatography was changed to 30000 or 60000 hr$^{-1}$. The results obtained are shown in Table 4 below.

TABLE 4

| Catalyst | Reducing Agent | SV (×10⁴) (hr⁻¹) | Nitrogen Conversion (%) 300° C. | 400° C. | 500° C. | 600° C. |
|---|---|---|---|---|---|---|
| D-1 | propane | 3 | 84.5 | 97.8 | 89.9 | 64.1 |
|  | propylene | 3 | 95.8 | 93.1 | 87.2 | 41.3 |
|  | propylene | 6 | 94.7 | 93.3 | 88.6 | 47.6 |
|  | 1,3-butadiene | 3 | 93.9 | 90.2 | 71.6 | 29.3 |
|  | ethanol | 3 | 93.5 | 84.2 | 44.9 | 20.5 |
| D-2 | propane | 3 | 89.1 | 92.4 | 81.1 | 64.3 |
| D-3 | propane | 3 | 83.3 | 98.9 | 91.0 | 72.8 |
| D-4 | propane | 3 | 67.5 | 78.5 | 73.6 | 58.1 |
|  | isobutane | 3 | 79.5 | 83.8 | 66.2 | 45.1 |
|  | propylene | 3 | 72.6 | 70.0 | 59.9 | 29.1 |
|  | propylene | 6 | 72.1 | 68.5 | 57.5 | 28.4 |
|  | trans-2-butene | 3 | 75.0 | 67.5 | 46.2 | 24.2 |
| D-5 | propane | 3 | 80.7 | 84.5 | 67.1 | 48.6 |
| D-6 | propane | 3 | 87.1 | 89.0 | 61.4 | 48.0 |
| D-7 | propane | 3 | 86.6 | 91.6 | 82.0 | 60.3 |
|  | 2-butanol | 3 | 92.1 | 70.1 | 43.6 | 12.2 |
| D-8 | propane | 3 | 91.7 | 88.5 | 63.4 | 33.8 |
| D-9 | propane | 3 | 92.8 | 93.5 | 89.8 | 66.9 |
| D-10 | propane | 3 | 83.8 | 85.3 | 65.6 | 54.0 |
| D-11 | cyclobutane | 3 | 90.9 | 87.9 | 76.1 | 52.8 |
| D-11 | ethylene glycol | 3 | 89.6 | 75.1 | 40.6 | 21.3 |
| D-12 | propane | 3 | 86.7 | 87.5 | 79.5 | 58.4 |
| D-13 | propane | 3 | 88.1 | 92.8 | 88.9 | 60.5 |
| D-14 | propane | 3 | 87.4 | 96.3 | 88.4 | 62.3 |
|  | propylene | 3 | 95.3 | 94.8 | 83.4 | 51.6 |
|  | 1-propanol | 3 | 97.8 | 83.0 | 61.8 | 48.6 |
| Z-1 | propane | 3 | 0.0 | 0.0 | 0.0 | 0.0 |
| Z-2 | propane | 3 | 7 | 11 | 18 | 15 |
| D-15 | propane | 3 | 61.7 | 77.4 | 75.5 | 54.9 |
| D-16 | propane | 3 | 82.6 | 89.1 | 50.8 | 36.0 |
| D-17 | propane | 3 | 92.0 | 88.5 | 79.9 | 57.6 |
| D-18 | propane | 3 | 94.9 | 86.3 | 57.5 | 39.1 |
| D-19 | propylene | 3 | 88.4 | 89.3 | 77.5 | 49.0 |
| D-20 | propylene | 3 | 91.1 | 93.4 | 72.0 | 44.8 |
| D-21 | propylene | 3 | 93.4 | 93.8 | 84.2 | 45.9 |
| D-22 | propylene | 3 | 90.9 | 85.4 | 53.9 | 31.3 |
| D-23 | propylene | 3 | 93.5 | 92.4 | 81.6 | 45.6 |
| D-24 | propylene | 3 | 75.8 | 73.1 | 44.2 | 28.6 |
| D-25 | propylene | 3 | 84.0 | 82.2 | 66.1 | 40.5 |
| D-26 | propane | 3 | 87.5 | 93.2 | 81.8 | 57.6 |
|  | propylene | 3 | 92.6 | 95.5 | 79.1 | 43.3 |
| D-26 | 1,3-butadiene | 3 | 91.3 | 87.6 | 62.1 | 33.2 |
|  | ethanol | 3 | 94.7 | 92.3 | 40.4 | 26.1 |
| D-27 | propane | 3 | 87.4 | 94.7 | 82.3 | 60.0 |
| D-28 | propane | 3 | 71.4 | 80.4 | 76.3 | 51.1 |
| D-29 | propane | 3 | 69.3 | 81.5 | 80.6 | 54.8 |
|  | isobutane | 3 | 71.7 | 82.0 | 73.8 | 50.4 |
|  | propylene | 3 | 88.2 | 89.3 | 83.6 | 62.8 |
|  | trans-2-butene | 3 | 84.9 | 81.4 | 68.1 | 43.5 |
| D-30 | propane | 3 | 69.4 | 77.2 | 64.6 | 48.3 |
| D-31 | propane | 3 | 76.3 | 84.9 | 81.2 | 69.1 |
| D-32 | propane | 3 | 66.5 | 80.4 | 82.0 | 65.5 |
|  | 2-butanol | 3 | 83.4 | 70.0 | 42.5 | 27.9 |
| D-33 | propane | 3 | 77.4 | 92.0 | 84.4 | 54.7 |
| D-34 | propane | 3 | 75.3 | 84.4 | 81.5 | 60.8 |
| D-35 | propane | 3 | 82.2 | 91.7 | 83.4 | 55.3 |
| D-36 | cyclobutane | 3 | 84.2 | 83.2 | 66.9 | 44.0 |
|  | ethylene glycol | 3 | 86.0 | 75.5 | 47.5 | 19.2 |
| D-37 | propylene | 3 | 90.6 | 84.9 | 51.4 | 28.4 |
| D-38 | propylene | 3 | 96.9 | 92.7 | 84.4 | 36.0 |
|  | propylene | 6 | 95.8 | 91.1 | 84.7 | 36.9 |
| D-39 | propylene | 3 | 93.6 | 89.4 | 62.2 | 30.0 |
| D-40 | propylene | 3 | 88.1 | 81.4 | 43.8 | 21.9 |
| D-41 | propylene | 3 | 89.6 | 83.0 | 46.7 | 25.4 |
| D-42 | propylene | 3 | 95.2 | 92.3 | 82.9 | 35.6 |
| D-43 | propylene | 3 | 98.1 | 94.6 | 86.1 | 33.8 |
| D-44 | propylene | 3 | 89.5 | 83.6 | 63.4 | 26.5 |
| D-45 | propylene | 3 | 74.5 | 65.0 | 49.3 | 19.7 |

As is apparent from Table 4, each of the catalysts according to the present invention (samples D-1 to 45) achieves a high conversion of nitrogen oxide to nitrogen, whereas the comparative catalysts (sample Z-1 and 2) exhibit no or little catalysis.

As described and demonstrated above, the catalyst according to the present invention efficiently catalyzes reduction of nitrogen oxide in emissions in the presence of oxygen.

While the invention has been described in detail and with reference to specific examples thereof, it will be apparent to one skilled in the art that various changes and modifications can be made therein without departing from the spirit and scope thereof.

What is claimed is:

1. A catalyst for catalytic reduction of nitrogen oxide using at least one reducing agent selected from the group consisting of a hydrocarbon and an oxygen-containing organic compound, wherein said catalyst comprises from about 0.1 to 70% by weight of an oxide which contains a perovskite phase and which is represented by formula (v):

$$A^5_x B^3_{3-x} C^4_3 O_7 \qquad (V)$$

wherein $A^5$ represents at least one element selected from the group consisting of La, Y, Ce, Pr, Nd, Sm, Eu, and Gd; $B^3$ represents at least one element selected from the group consisting of Ba, Sr, Ca, Mg, Pb, Zn, and Ag; $C^4$ represents at least one element selected from the group consisting of Mn, Co, Fe, Ni, Cr, Cu, V, Mo, W, Ti, Zr, Nb, Pd, Rh, Ru, and Pt; and x is a number of from 0 to 1, supported on a solid acid carrier.

2. A catalyst as claimed in claim 1, wherein the solid acid carrier is selected from the group consisting of $Al_2O_3$, $ZrO_2$, and $SiO_2/Al_2O_3$.